(12) United States Patent
Nakahara

(10) Patent No.: US 11,188,284 B2
(45) Date of Patent: Nov. 30, 2021

(54) INFORMATION PROCESSING APPARATUS, INFORMATION PROCESSING METHOD, AND PROGRAM TO EXECUTE AND STORE FIRST AND SECOND INFORMATION ON A BASIS OF HISTORY INFORMATION OF A DEVICE

(71) Applicant: CANON KABUSHIKI KAISHA, Tokyo (JP)

(72) Inventor: Hidetaka Nakahara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 462 days.

(21) Appl. No.: 16/336,705

(22) PCT Filed: Sep. 26, 2017

(86) PCT No.: PCT/JP2017/034767
§ 371 (c)(1),
(2) Date: Mar. 26, 2019

(87) PCT Pub. No.: WO2018/066412
PCT Pub. Date: Apr. 12, 2018

(65) Prior Publication Data
US 2021/0294549 A1    Sep. 23, 2021

(30) Foreign Application Priority Data

Oct. 3, 2016    (JP) .............................. JP2016-195832

(51) Int. Cl.
*G06F 3/12*    (2006.01)

(52) U.S. Cl.
CPC .......... *G06F 3/1273* (2013.01); *G06F 3/1204* (2013.01); *G06F 3/1253* (2013.01); *G06F 3/1274* (2013.01); *G06F 3/1267* (2013.01)

(58) Field of Classification Search
None
See application file for complete search history.

(56) References Cited

U.S. PATENT DOCUMENTS 7,852,502 B2 *  12/2010  Horiyama ............. G06F 3/1203
                                                                 358/1.15
9,525,796 B2    12/2016  Nakahara ........... H04N 1/00928
(Continued)

FOREIGN PATENT DOCUMENTS

JP    2012-053499    3/2012
JP    2015-150707    8/2015

OTHER PUBLICATIONS

International Search Report and Written Opinion dated Jan. 5, 2018 in counterpart PCT/JP2017/034767.
(Continued)

*Primary Examiner* — Haris Sabah
(74) *Attorney, Agent, or Firm* — Venable LLP

(57) ABSTRACT

It is an object to allow a device to execute the operation to which a past history was reflected. A management server uses a filter template and an analysis template as templates for executing a process to instruct an information processing apparatus (multifunction machine) by using history storage data in a history storage DB. The filter template is a template in which information showing that summary data is generated by executing a filtering of the history storage data in the history storage DB and stored into a summary DB has been described. The analysis template is a template in which information showing that contents of the instruction to the information processing apparatus are determined by analyzing the summary data has been described.

11 Claims, 18 Drawing Sheets

(56) References Cited

U.S. PATENT DOCUMENTS

| | | | | |
|---|---|---|---|---|
| 9,973,643 | B2 | 5/2018 | Nakahara | H04N 1/00928 |
| 2007/0268502 | A1 | 11/2007 | McCarthy et al. | 358/1.9 |
| 2012/0053868 | A1* | 3/2012 | Matsumoto | G06F 1/28 |
| | | | | 702/61 |
| 2012/0140273 | A1* | 6/2012 | Vorobyev | G06F 3/122 |
| | | | | 358/1.15 |
| 2013/0278964 | A1 | 10/2013 | Zeng et al. | 358/1.15 |
| 2014/0067886 | A1* | 3/2014 | Sakanashi | G06F 11/0778 |
| | | | | 707/825 |
| 2015/0268610 | A1* | 9/2015 | Takahashi | G03G 15/5079 |
| | | | | 399/10 |
| 2016/0142565 | A1* | 5/2016 | Kida | H04N 1/00938 |
| | | | | 358/1.15 |

OTHER PUBLICATIONS

International Preliminary Report on Patentability (IPRP) and Written Opinion dated Apr. 18, 2019 in counterpart PCT/JP2017/034767.

\* cited by examiner

[Fig. 1]
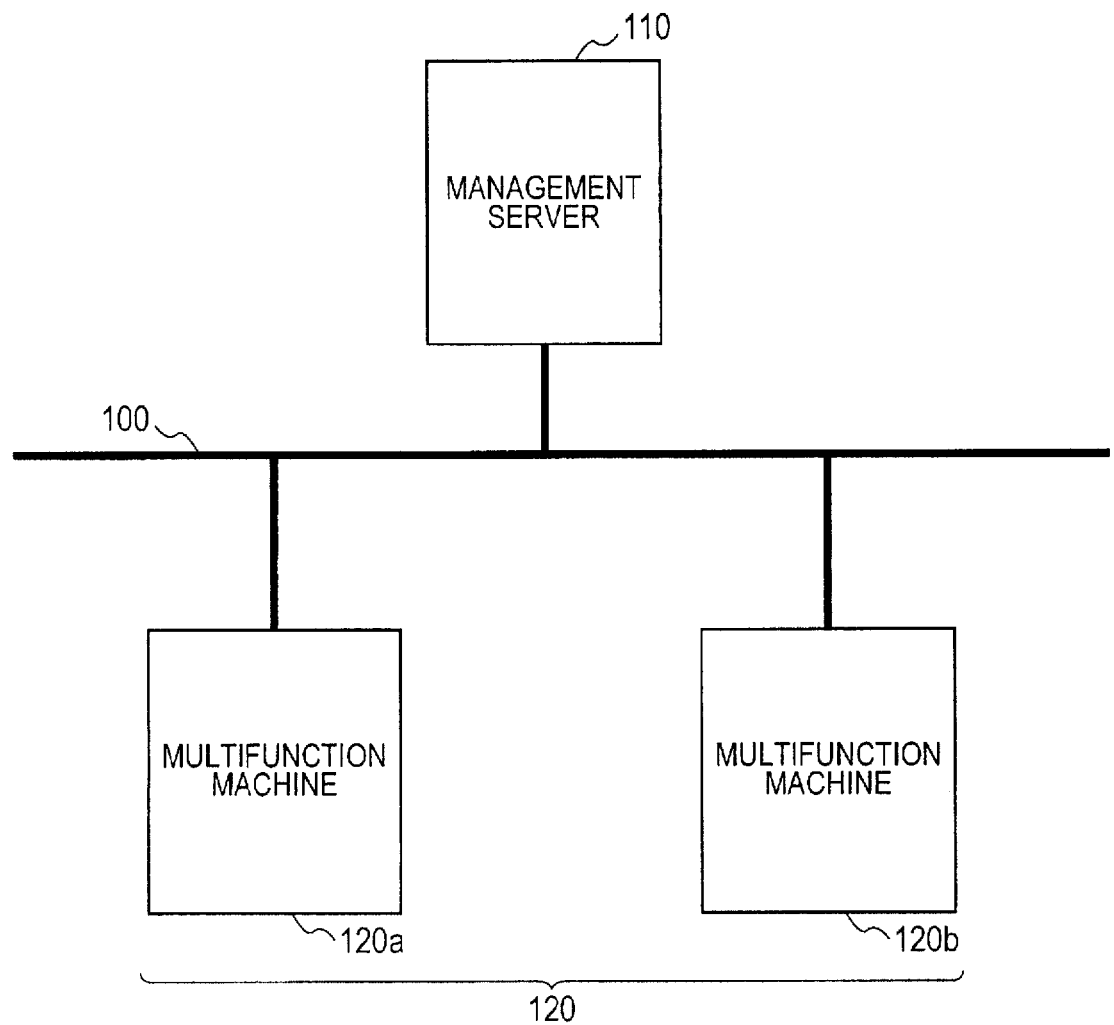

[Fig. 2]
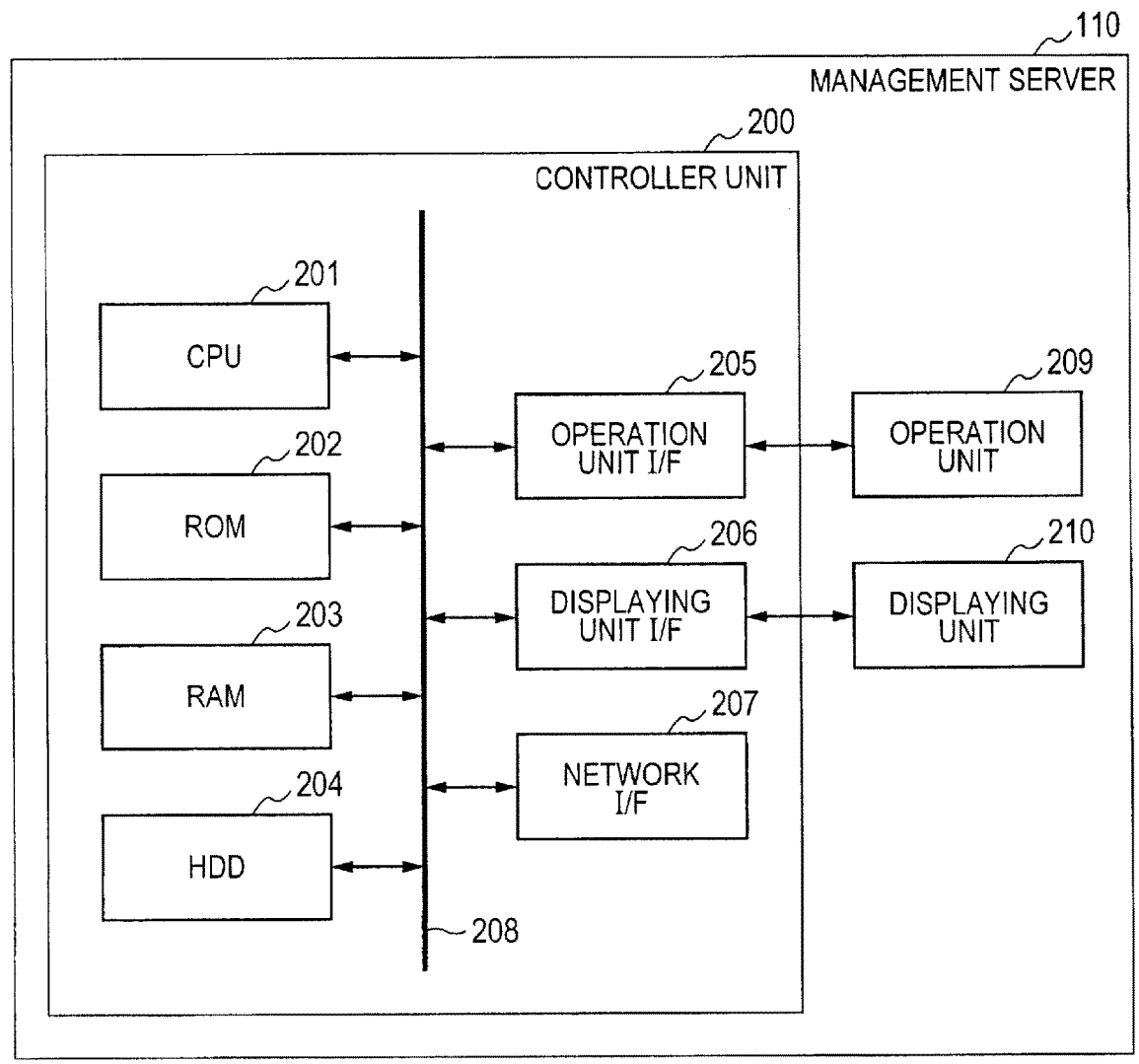

[Fig. 3]
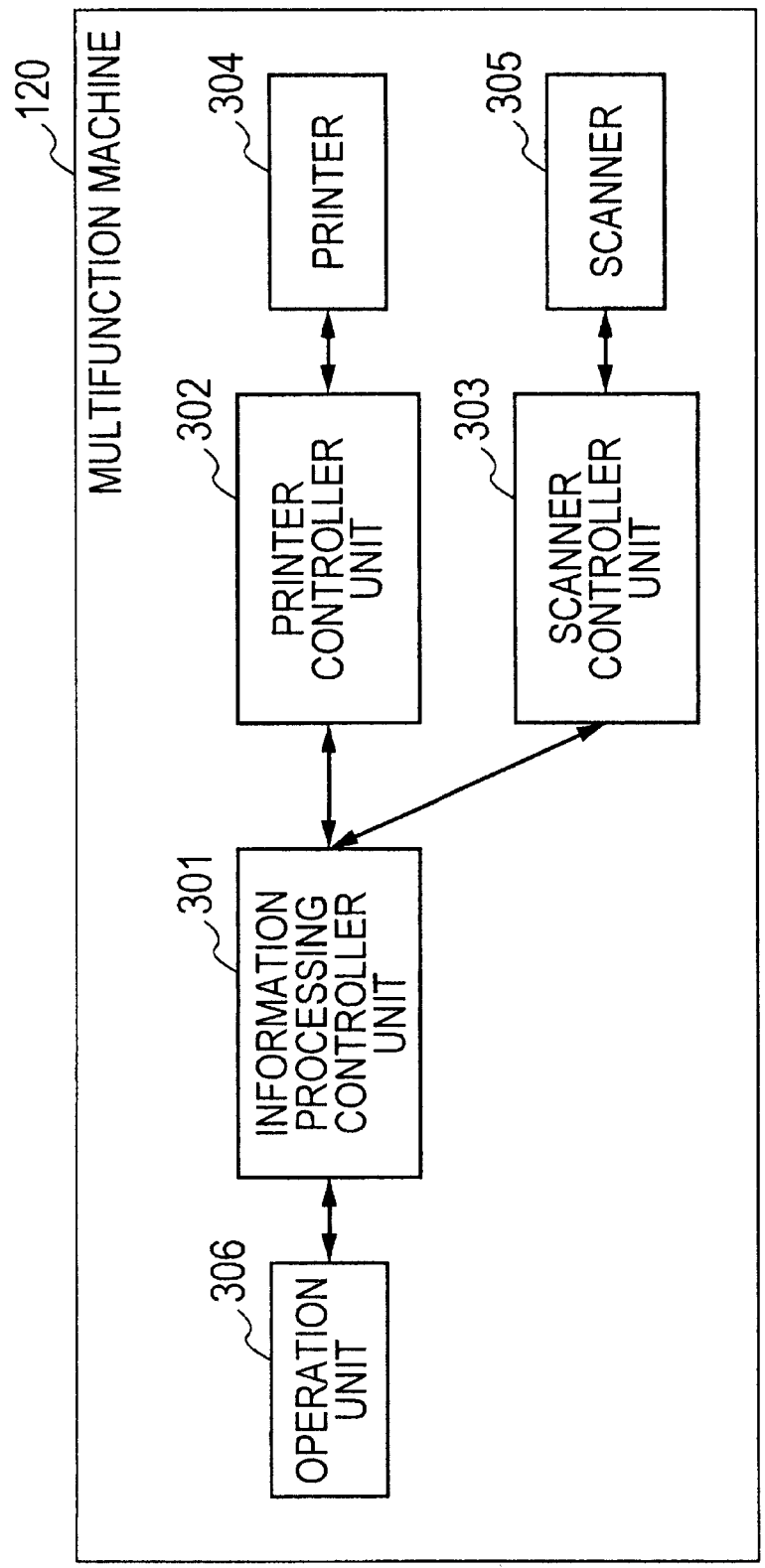

[Fig. 4]
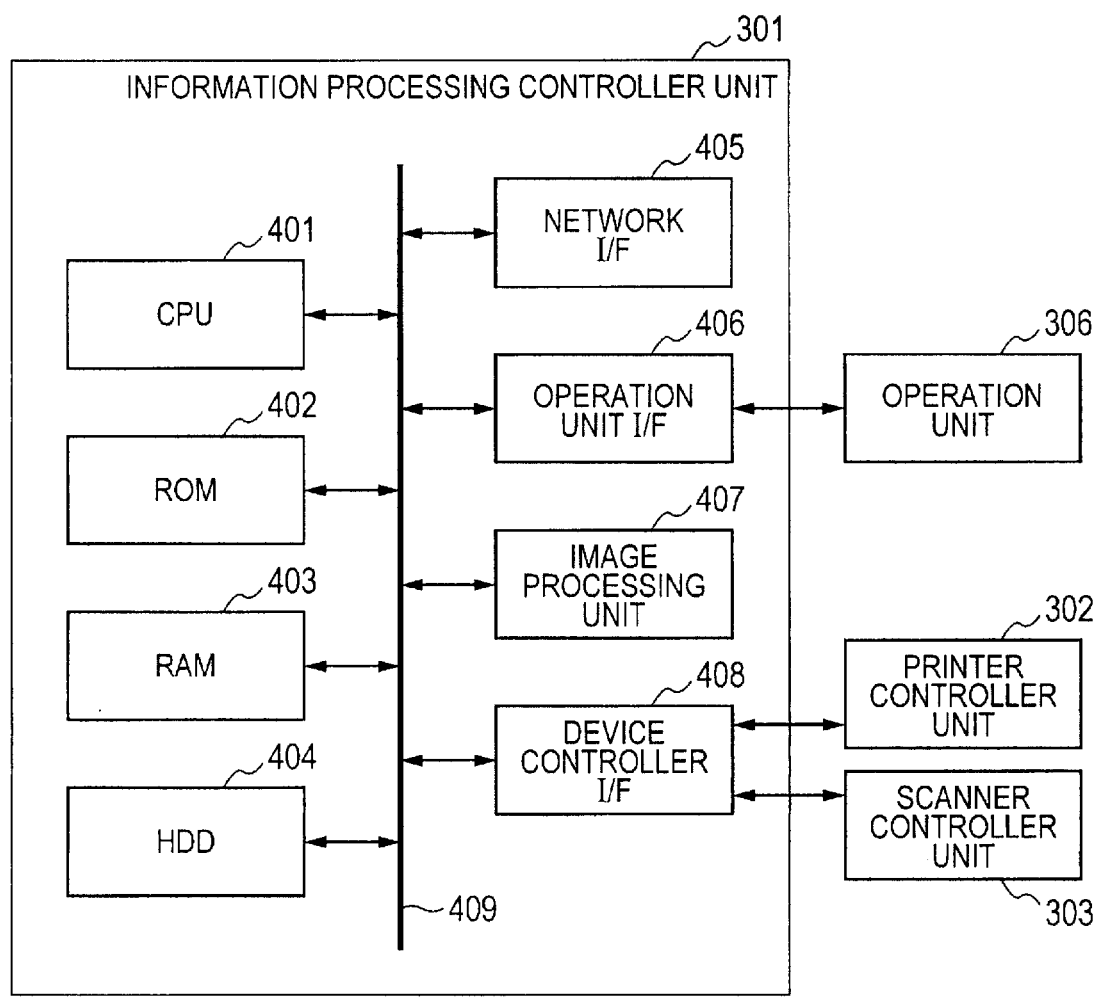

[Fig. 5]
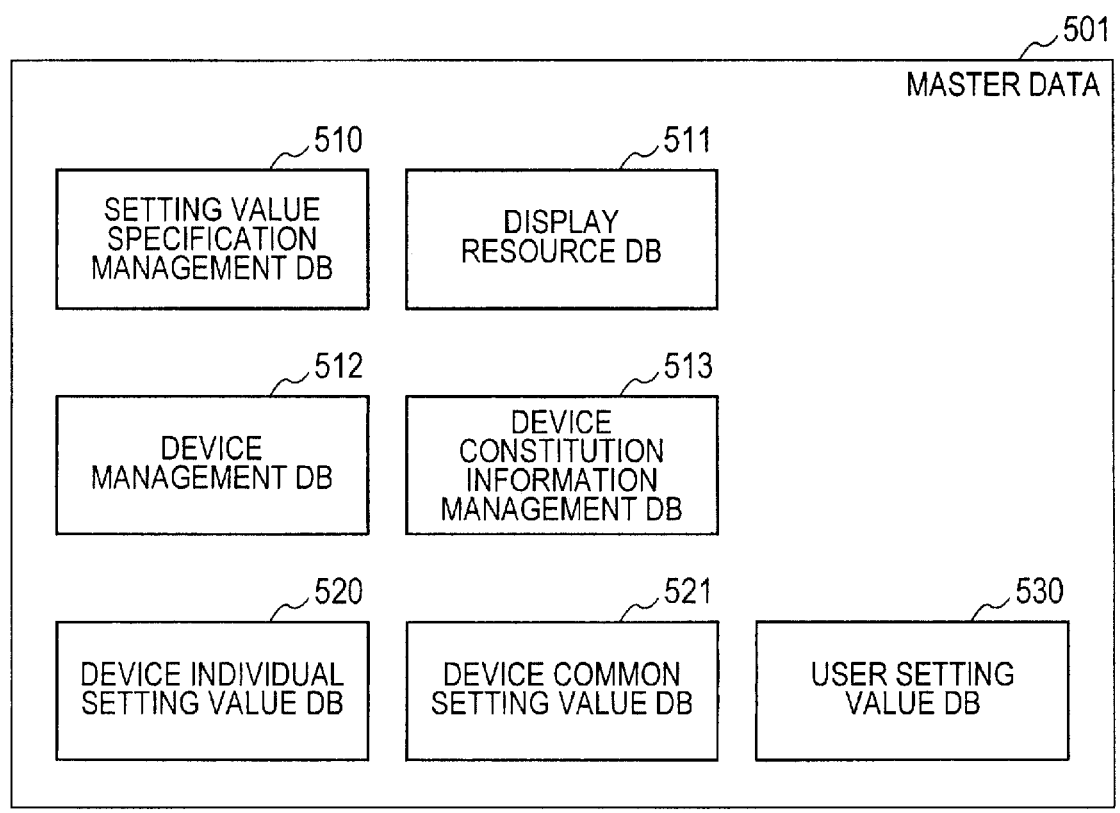

[Fig. 6]
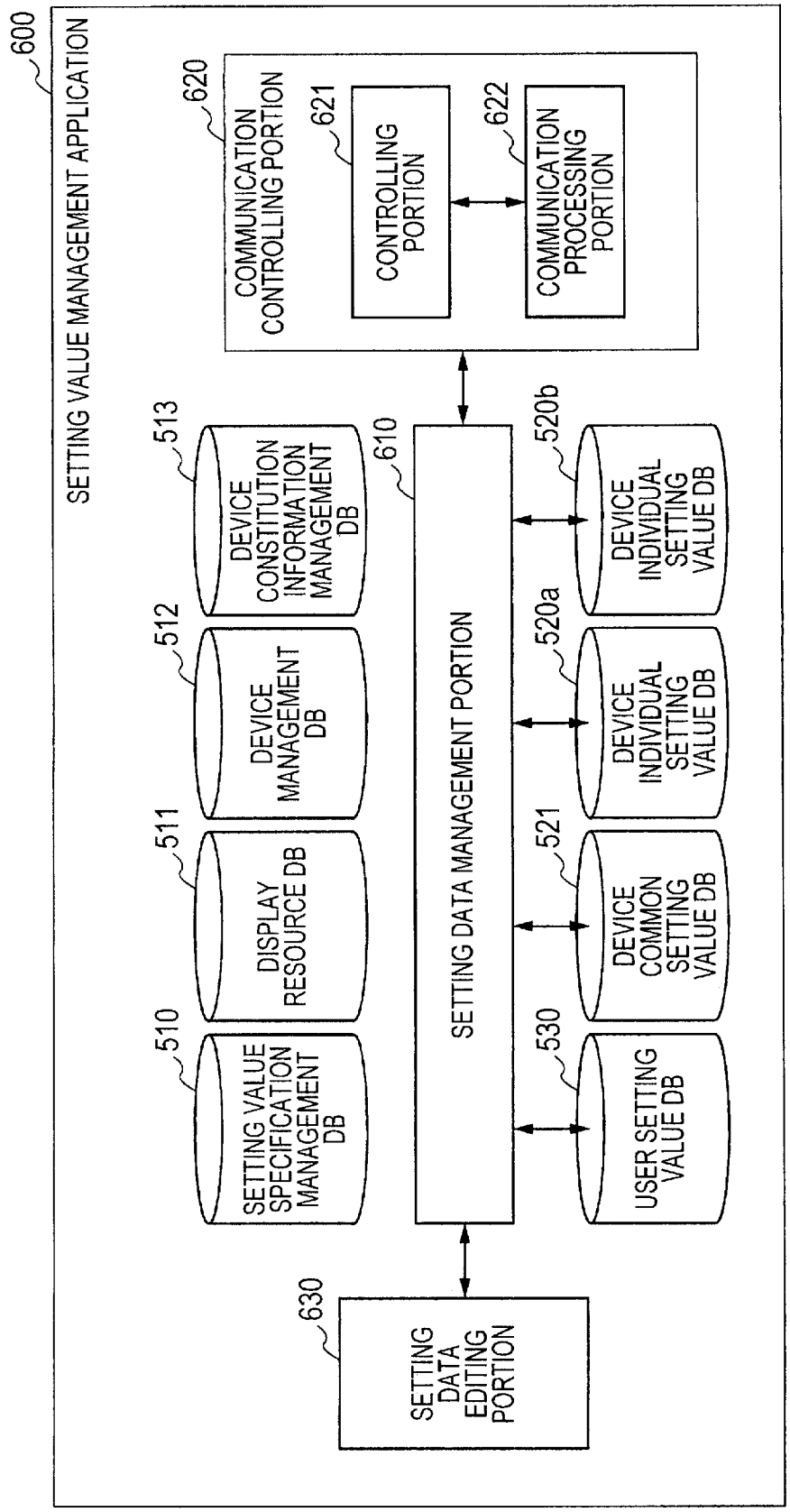

[Fig. 7]
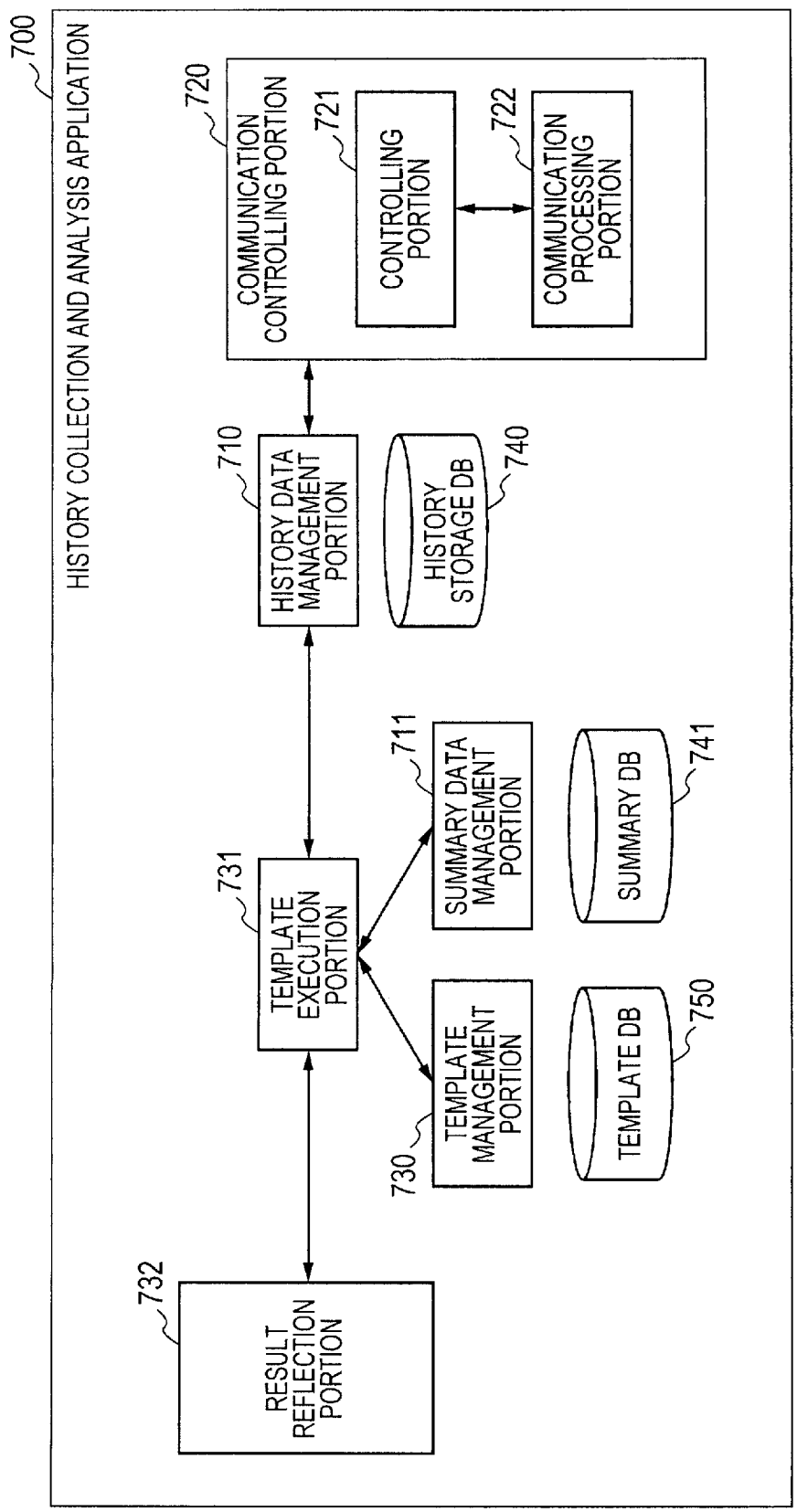

[Fig. 8]
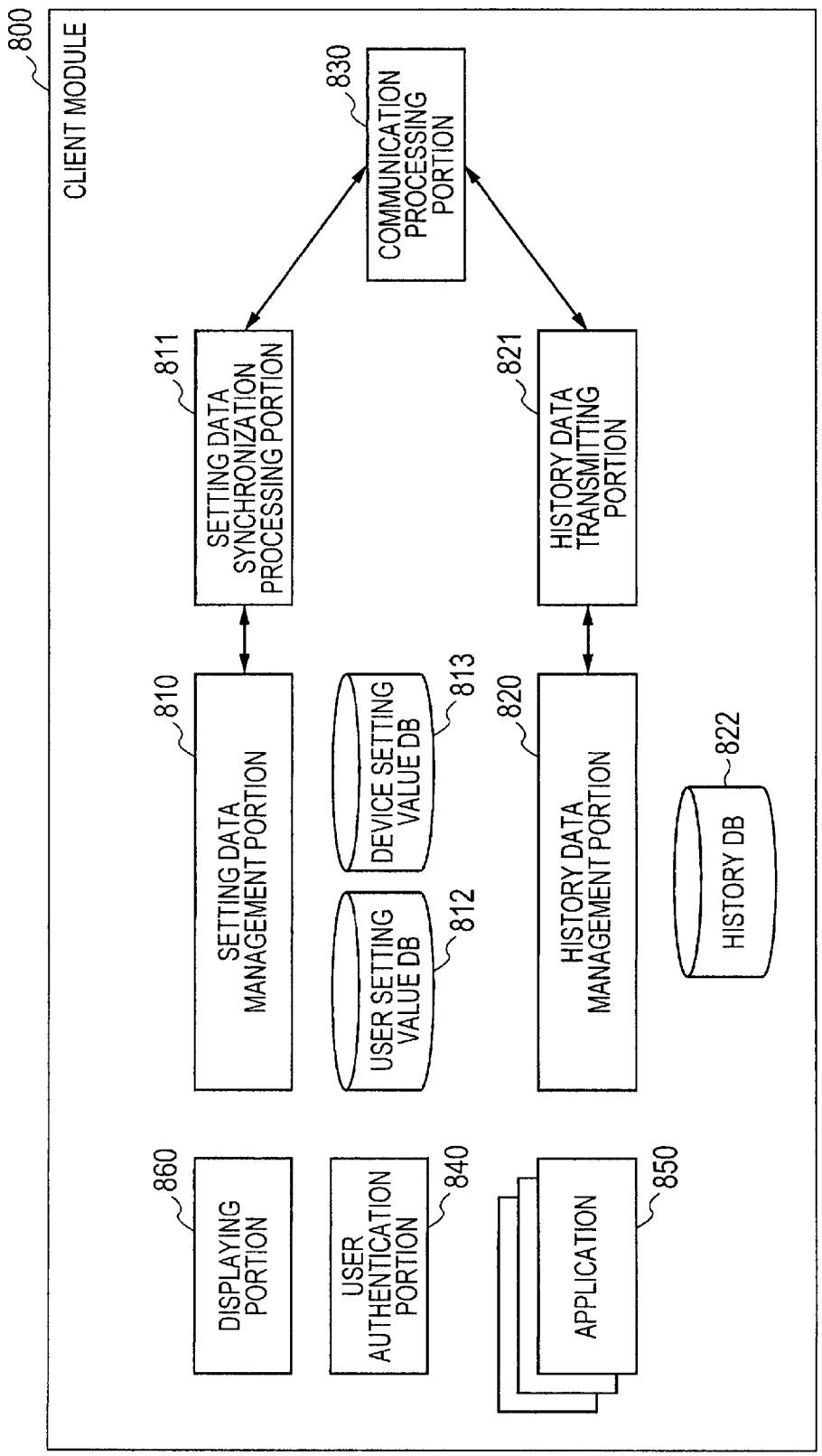

[Fig. 9]
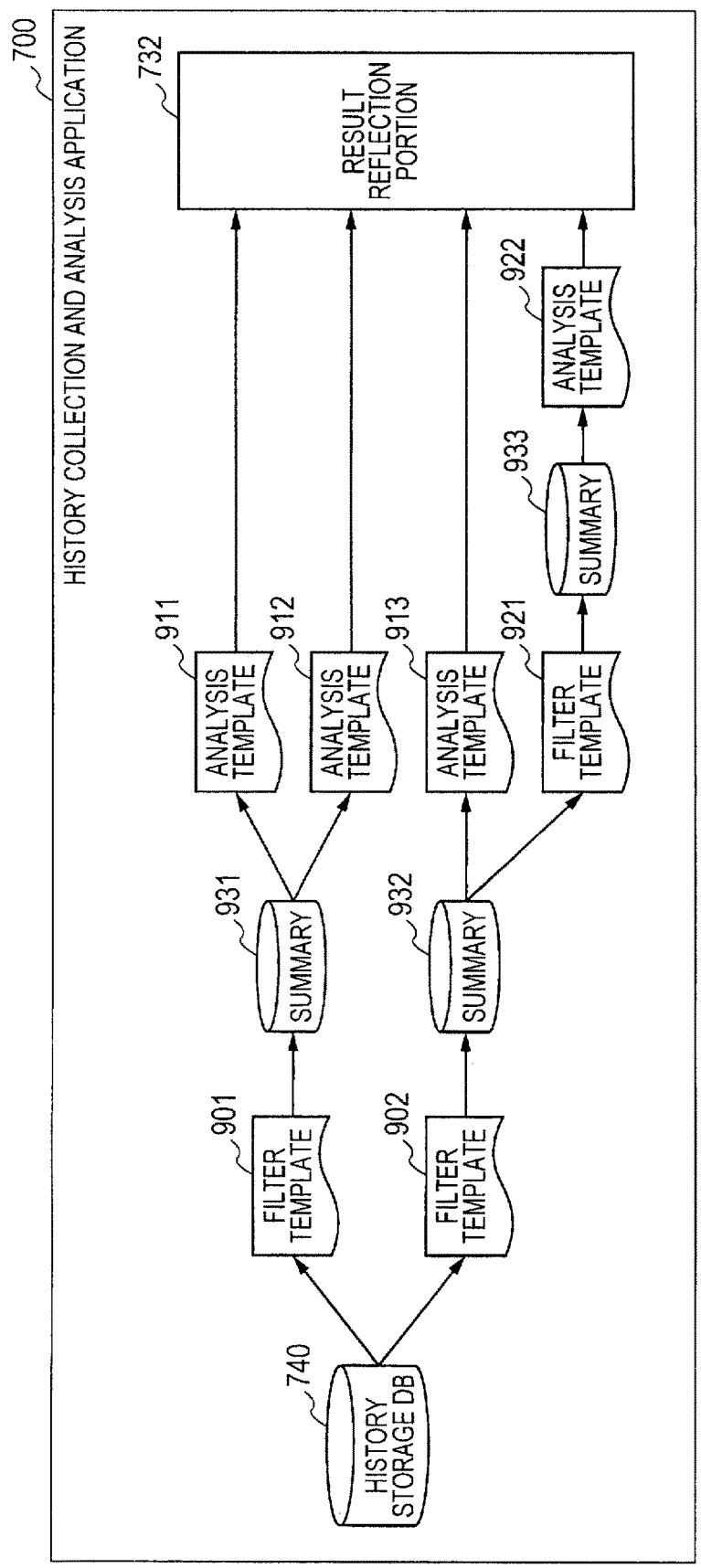

[Fig. 10A]

```
listData = fromDB.Execute( "SELECT id, Date, Count FROM JobLogTBL WHERE Type == 'PrintJobLog' AND id > ReadPointer;" );  ~1011 dayliydata = listData.Date;
dayliycount = 0;
while (listData.next()!= NULL ){
    if( dayliydata == listData.Date )              ~1012
        dayliycount += listData.Count;
    else{
        toDB.Execute( "INSERT INTO SummaryTBL (Date, Count ) VALUES(¥"" + dayliydata + ¥"",¥"" + dayliycount ¥"");" );  ~1013
        ReadPointerID = listData.id
        dayliydata = listData.Date;
        dayliycount = listData.Count;
    }
    toDB.Execute( "INSERT INTO CtrolTBL ( ReadPointer )VALUES(¥"" + id ¥"");" );  ~1014
```

```
{
  "JSFilename"     : "Template.js",
  "FromDBFilename" : "Integrated.db",
  "ToDBFilename"   : "Summary_PrintCount.db",
  "StartTime"      : "2016/01/01 02:00:00",
  "RepeatFreq"     : "24:00:00",
  "ReadLogType"    : "PrintJobLog"
}
```

```
listData = fromDB.Execute( "SELECT Count FROM SummaryTBL WHERE Date > FirstRecord AND Date < LastRecord" );     ~1111 average = 0;
count = 0 while(listData.next()!= NULL ){      ~1112
  average += listData.Count;
  ++count;
}
average = average/count;

if( average > threshold ) {      ~1113
  SetConfigration ( "print_setttings.xxx" , 1 );
}
```

```
{
  "JSFilename"     : "Analysis.js",
  "FromDBFilename" : "Summary_PrintCount.db",
  "ToDBFilename"   : NULL,
  "StartTime"      : "2016/01/01 02:00:00",
  "RepeatFreq"     : "24:00:00",
  "FirstRecord"    : "2016/01/01",
  "LastRecord"     : TODAY;
  "Threshold"      : "300"
}
```

1102

[Fig. 12A]
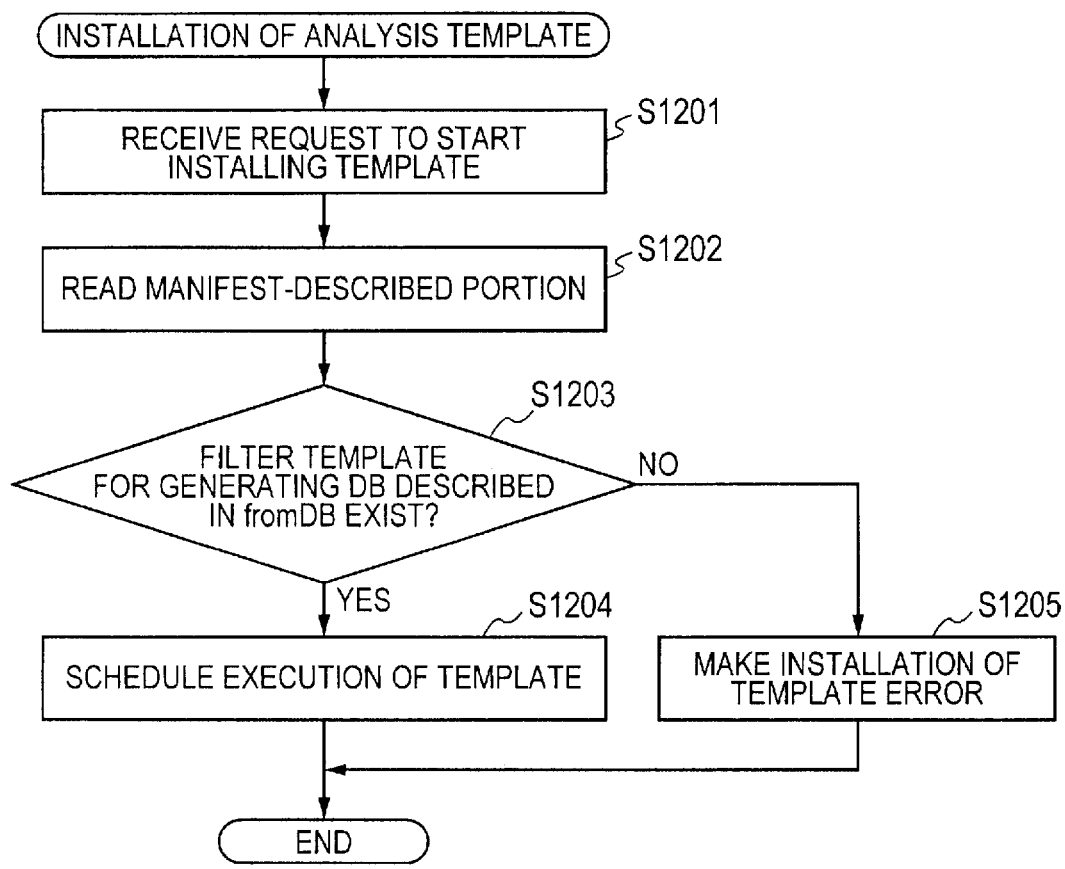

[Fig. 12B]
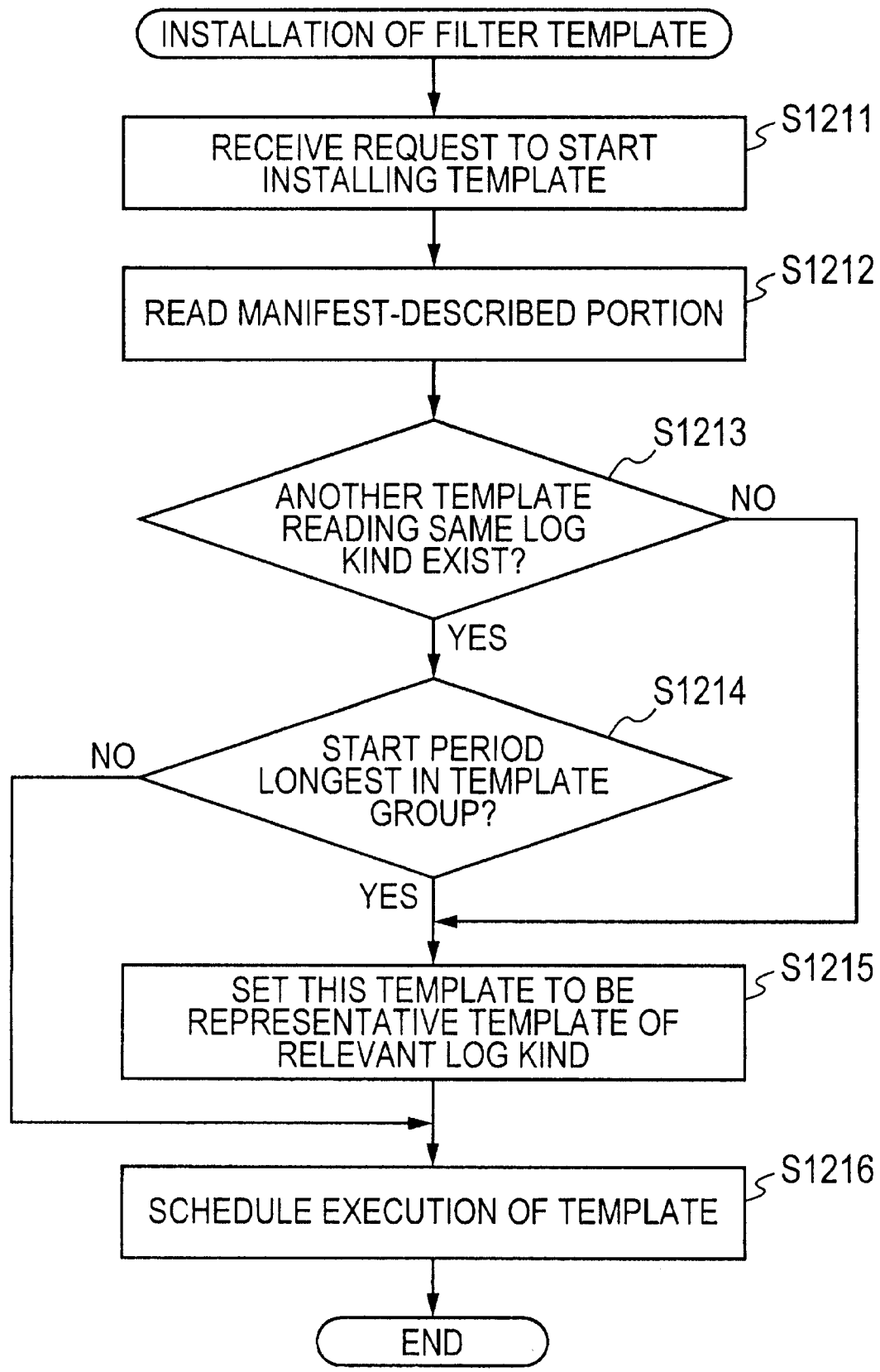

[Fig. 13A]
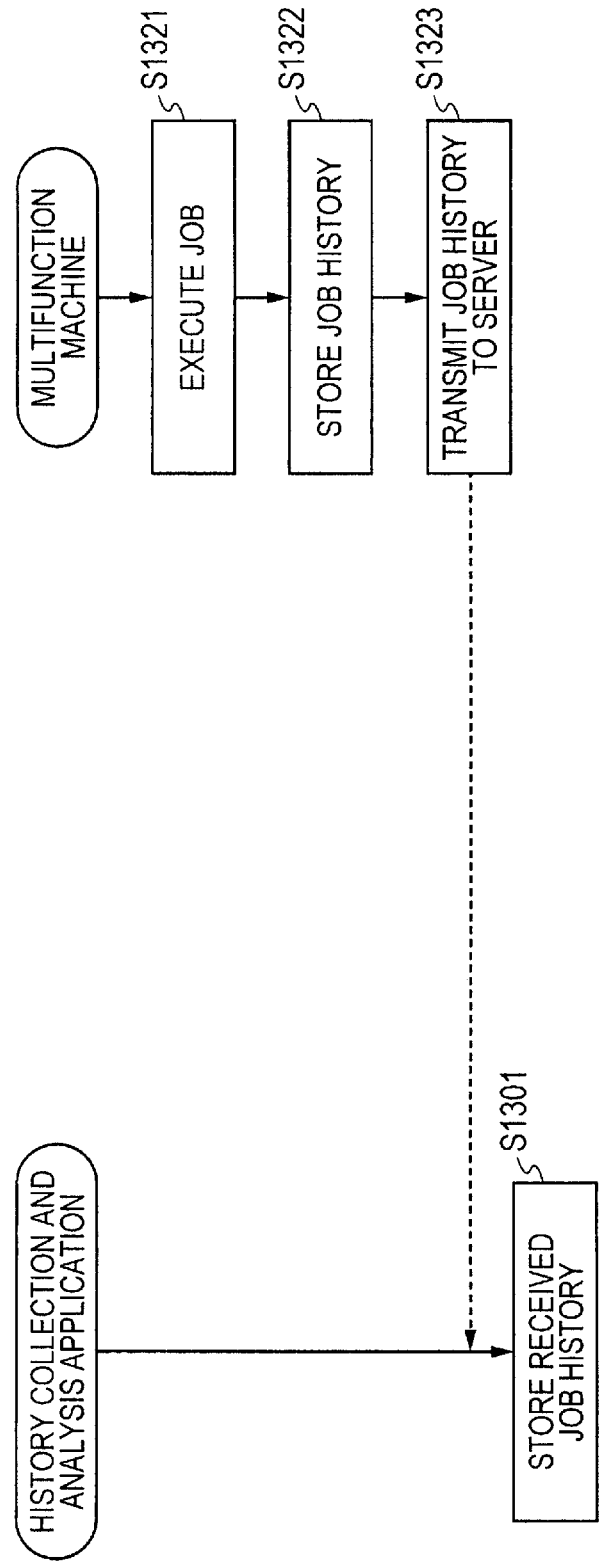

[Fig. 13B]
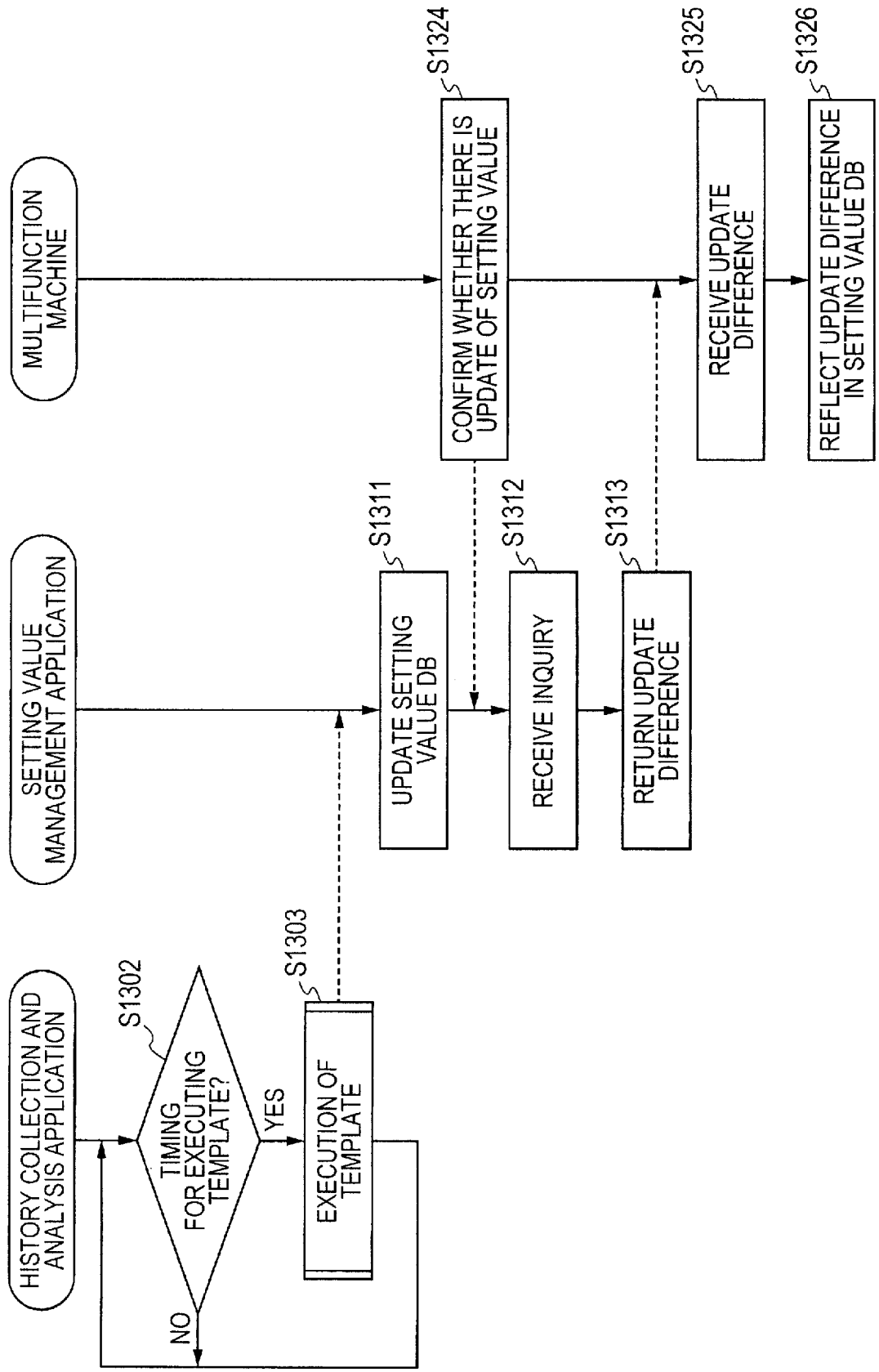

[Fig. 14]
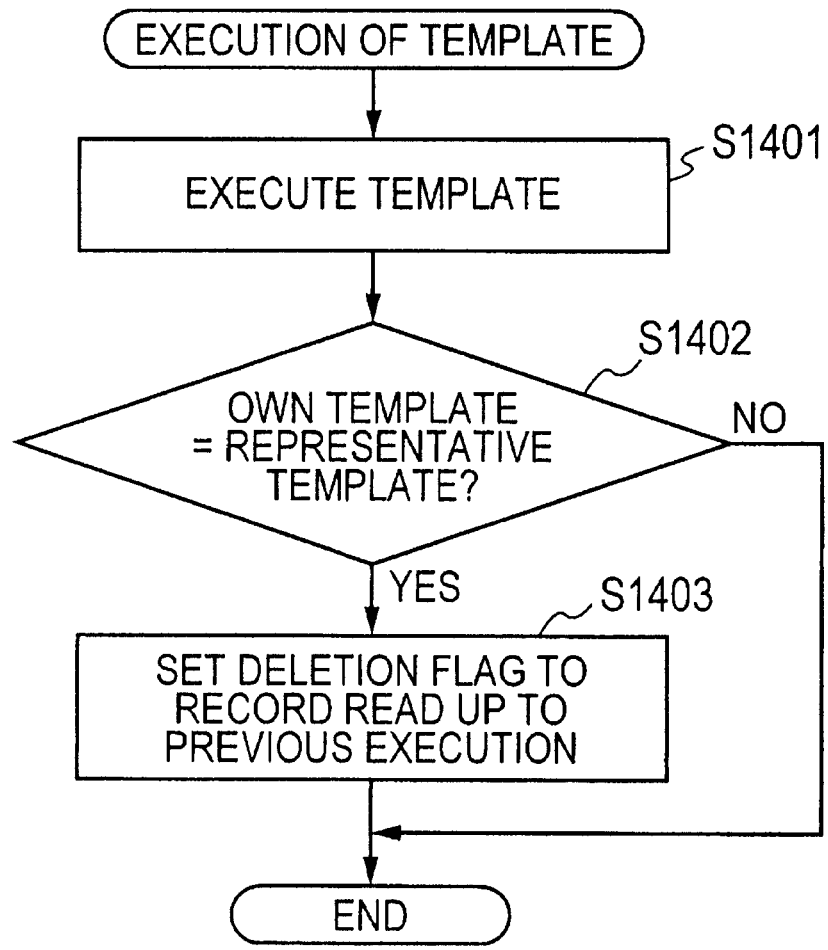

INFORMATION PROCESSING APPARATUS, INFORMATION PROCESSING METHOD, AND PROGRAM TO EXECUTE AND STORE FIRST AND SECOND INFORMATION ON A BASIS OF HISTORY INFORMATION OF A DEVICE

TECHNICAL FIELD

The present invention relates to an information processing apparatus, an information processing method, and a program and, more particularly, is suitable for use to make an instruction to a device.

BACKGROUND ART

There is a technique for collecting, analyzing, or using history information of a device. An information processing apparatus disclosed in PTL 1 collects histories of jobs in an image forming apparatus and visualizes a detailed transition of electric power consumption of the image forming apparatus. An information processing apparatus disclosed in PTL 2 stores a history of print settings in association with a kind of print job and presents a change of a recommended print setting on the basis of a history of the past print settings associated with a kind of print job which is input after that.

CITATION LIST

Patent Literature

[PTL 1] Japanese Patent Application Laid-Open No. 2012-53499
[PTL 2] Japanese Patent Application Laid-Open No. 2015-150707

SUMMARY OF INVENTION

Technical Problem

However, according to the related arts, an operation history in a device is merely visualized and a setting associated with the operation history in the device is merely reproduced. Therefore, in the related arts, for example, even if there is another setting in which the user can more easily use the device as compared with the setting applied to the device in the past, it is not easy to provide such a relevant easy-to-use setting to the user. Now, not only the user who uses the device but also an administrator or the like of a system including the device is incorporated in the user.

The present invention is made in consideration of such a problem and it is an aspect of the invention to enable a device to execute an operation to which a past history has been reflected.

Solution to Problem

According to the invention, there is provided an information processing apparatus comprising: a first storing unit configured to store first history information of a device; a second storing unit configured to store first information showing an execution of a process including such operations that history information of the device is obtained, history information in which a data amount of the history information was reduced is generated, and the history information in which the data amount was reduced is stored; a third storing unit configured to store, separately from the first information, second information showing an execution of a process including such operations that the history information in which the data amount was reduced is obtained and contents of an instruction to the device are determined on the basis of the history information in which the data amount was reduced; and an executing unit configured to execute the processes shown in the first information and the second information, wherein the second storing unit stores information, as the first information, showing an execution of a process including such operations that the first history information is obtained, second history information in which the data amount of the first history information was reduced is generated, and the second history information is stored, and the third storing unit stores information, as the second information, showing an execution of a process including such operations that the second history information is obtained and contents of an instruction to the device are determined on the basis of the second history information.

Advantageous Effects of Invention

According to the present invention, it is possible to enable the device to execute the operation to which the past history has been reflected.

Further features of the present invention will become apparent from the following description of exemplary embodiments with reference to the attached drawings.

BRIEF DESCRIPTION OF DRAWINGS

FIG. 1 is a diagram illustrating a constitution of an information processing system.
FIG. 2 is a diagram illustrating a constitution of hardware of a management server.
FIG. 3 is a diagram illustrating a constitution of hardware of a multifunction machine.
FIG. 4 is a diagram illustrating a constitution of an information processing controller unit of the multifunction machine.
FIG. 5 is a diagram illustrating a constitution of master data.
FIG. 6 is a diagram illustrating a constitution of software of a setting value management application.
FIG. 7 is a diagram illustrating a constitution of software of a history collection and analysis application.
FIG. 8 is a diagram illustrating a constitution of software of a client module on the side of the multifunction machine.
FIG. 9 is a diagram illustrating a flow of data in the history collection and analysis application.
FIG. 10A is a diagram illustrating a part of the contents of a filter template.
FIG. 10B is a diagram illustrating a part of the contents of a filter template.
FIG. 11A is a diagram illustrating a part of the contents of an analysis template.
FIG. 11B is a diagram illustrating a part of the contents of an analysis template.
FIG. 12A is a diagram illustrating a first process at the time of installing a template.
FIG. 12B is a diagram illustrating a second process at the time of installing a template.
FIG. 13A is a diagram illustrating a process at the time of storing history information.
FIG. 13B is a diagram illustrating a process at the time of changing the setting of the multifunction machine.

FIG. 14 is a diagram illustrating details of step S1303 in FIG. 13B.

DESCRIPTION OF EMBODIMENTS

An embodiment will be described hereinbelow with reference to the drawings. The embodiment will be described with respect to an example of a case where a device serving as a client which communicates with a management server is a multifunction machine. However, the device is not limited to the multifunction machine. For example, the device may be an electronic apparatus (for example, printer, copying apparatus, FAX) for individually realizing each function provided for the multifunction machine. The device may be also an electronic apparatus (for example, tablet terminal, cellular phone) which can be carried by the user.

FIG. 1 is a diagram illustrating an example of a constitution of an information processing system. The information processing system has a network 100, a management server 110, and a plurality of multifunction machines 120a and 120b. The management server 110 and the multifunction machines 120a and 120b are connected to the network 100. The two multifunction machines 120a and 120b are illustrated in FIG. 1 for convenience of illustration. However, the number of multifunction machines 120a and 120b is not limited to 2. In the following description, the multifunction machines 120a and 120b are generally expressed as a multifunction machine 120.

The management server 110 is an example of an information processing apparatus. The management server 110 has a history collection and analysis application and a setting value management application. The history collection and analysis application collects and analyzes history information of jobs executed in the multifunction machine 120 and history information of the user's operation to the multifunction machine 120. The setting value management application manages a group of setting values which are used in the multifunction machine 120. When it is determined that the setting of the multifunction machine 120 should be changed, the setting value management application reflects the relevant setting to the multifunction machine 120. In the embodiment, a case where those two applications have been installed in the same management server 110 will be described as an example. However, those two applications may operate in different servers in an environment so long as it is an environment in which those two applications can communicate with each other.

The history collection and analysis application collects and analyzes the history information (log information) which is transmitted from the multifunction machine 120 through the network 100. The history collection and analysis application receives a result of the analysis of the history information and communicates with the setting value management application. The setting value management application changes the setting of the multifunction machine in which a change of the setting is necessary between the multifunction machines 120a and 120b on the basis of a result of the communication with the history collection and analysis application.

If the contents held in a database (DB) of the management server 110 were changed, the setting value management application updates a database (DB) of the multifunction machine 120 in accordance with such a change. If the contents held in a database (DB) of the multifunction machine 120 were changed, the setting value management application updates the database (DB) of the management server 110 in accordance with such a change.

The multifunction machine 120 is an electronic apparatus for realizing a plurality of kinds of functions (for example, print, copy, FAX). The multifunction machine 120 has a function for holding histories at the time of execution of those functions, a function for holding setting values used at the time of execution of those functions, and a function (a function for transmitting those histories and setting values, or the like) for communicating with the management server 110.

FIG. 2 is a block diagram illustrating an example of a constitution of hardware of the management server 110. The management server 110 may be a general PC (Personal Computer) having a computer and a display or may be a multifunction machine similar to the multifunction machine 120. The management server 110 includes a controller unit 200, an operation unit 209, and a displaying unit 210.

The controller unit 200 has a CPU (Central Processing Unit) 201. The CPU 201 activates an OS (Operating System) by a boot program stored in a ROM (Read Only Memory) 202. On this OS, the CPU 201 executes an application program stored in an HDD (Hard Disk Drive) 204. The CPU 201 realizes various kinds of processes by executing the application program. A RAM (Random Access Memory) 203 is used as a work area of the CPU 201. The application program, master data, and the like are stored in the HDD 204. Details of a managing method of the master data will be described hereinafter.

The CPU 201 is mutually connected to the ROM 202, the RAM 203, an operation unit I/F 205, a displaying unit I/F 206, and a network I/F 207 through a system bus 208. The operation unit I/F 205 is an interface with the operation unit 209. The operation unit I/F 205 transmits information which was input through the operation unit 209 by the user to the CPU 201. The operation unit 209 has a mouse, a keyboard, and the like. The displaying unit I/F 206 outputs image data to be displayed onto the displaying unit 210 to the displaying unit 210. The displaying unit 210 has a computer display. The network I/F 207 is connected to the network 100. Through the network 100, the network I/F 207 inputs and outputs information to/from each apparatus connected to the network 100.

FIG. 3 is a block diagram illustrating an example of a constitution of hardware of the multifunction machine 120. The multifunction machine 120 includes an information processing controller unit 301, a printer controller unit 302, a scanner controller unit 303, a printer 304, a scanner 305, and an operation unit 306. The information processing controller unit 301 is a controller for supervising information processing control regarding the operation of the multifunction machine 120. The printer controller unit 302, scanner controller unit 303, and operation unit 306 are connected to the information processing controller unit 301. The printer controller unit 302 controls the printer 304 as an image outputting device. The scanner controller unit 303 controls the scanner 305 as an image inputting device. The operation unit 306 has a touch panel, various kinds of buttons, and the like.

FIG. 4 is a block diagram illustrating an example of a constitution of the information processing controller unit 301 of the multifunction machine 120. The information processing controller unit 301 has a CPU 401. The CPU 401 activates the OS by a boot program stored in a ROM 402. On this OS, the CPU 401 executes an application program stored in an HDD 404. The CPU 401 realizes various kinds of processes by executing the application program. A RAM 403 is used as a work area of the CPU 401. The RAM 403 provides not only the work area but also an image memory area for temporarily storing image data. The application program, image data, and various kinds of setting values are stored in the HDD 404. A managing method of the setting values in the multifunction machine 120 will be described hereinafter.

The CPU 401 is mutually connected to the ROM 402, the RAM 403, an operation unit I/F 406, a device controller I/F 408, a network I/F 405, and an image processing unit 407 through a system bus 409. The operation unit I/F 406 is an interface with the operation unit 306. The operation unit I/F 406 outputs image data to be displayed in accordance with a touch panel provided for the operation unit 306 to the operation unit 306. The operation unit I/F 406 transmits information which was input through the operation unit 306 by the user to the CPU 401. The printer controller unit 302 and the scanner controller unit 303 are connected to the device controller I/F 408. The device controller I/F 408 performs a synchronous/asynchronous conversion of the image data. The network I/F 405 is connected to the network 100. Through the network 100, the network I/F 405 inputs and outputs information to/from each apparatus connected to the network 100. The image processing unit 407 executes processes such as imaging process, image rotation, image compression, resolution conversion, color space conversion, gradation conversion, and the like. Those processes are executed to the image data which is output to the printer 304 and the image data which was input from the scanner 305.

FIG. 5 is a block diagram illustrating an example of a constitution of master data which is managed by the setting value management application which operates in the management server 110. As illustrated in FIG. 5, master data 501 has the following databases.

A setting value specification management DB 510 manages specifications of the setting to the multifunction machine 120. A display resource DB 511 manages information of display resources of a display screen which is displayed when the setting values of the multifunction machine 120 are edited. A device management DB 512 manages information of the multifunction machine 120 registered in the management server 110. A device constitution information management DB 513 manages information such as an option constitution or the like of the multifunction machine 120 registered in the management server 110.

A device common setting value DB 521 manages setting values which are set in common to a plurality of multifunction machines 120 registered in the management server 110. A device individual setting value DB 520 manages setting values which are individually set into the plurality of multifunction machines 120 registered in the management server 110. A user setting value DB 530 manages setting values which are set into the multifunction machine 120 on a unit basis of the user who logs-in to the management server 110. Each of the device common setting value DB 521, device individual setting value DB 520, and user setting value DB 530 has data which is expressed by a combination of Key-Value. The setting values which are managed by the device common setting value DB 521, device individual setting value DB 520, and user setting value DB 530 are respectively associated with the user who logs-in to all of the multifunction machines 120 registered in the management server 110, one multifunction machine 120, and the management server 110.

FIG. 6 is a block diagram illustrating an example of a constitution of software of a setting value management application 600 which operates in the management server 110. In the embodiment, it is assumed that the setting value management application 600 is stored into any one of the storing units such as RAM 203, HDD 204, and ROM 202 and is executed by the CPU 201. The setting value management application 600 has a setting data management portion 610, a communication controlling portion 620, and a setting data editing portion 630. The setting data management portion 610 manages the reading and writing of the device individual setting value DB 520, device common setting value DB 521, and user setting value DB 530 in the master data 501 stored in the management server 110. As for the device individual setting value DB 520, the device individual setting value DB 520 of the number as many as the number of multifunction machines 120 in which the setting values are set synchronously with the setting values which are managed by the management server 110 exist. The device common setting value DB 521, device individual setting value DB 520, and user setting value DB 530 which are managed by the setting data management portion 610 are stored in, for example, the HDD 204.

The communication controlling portion 620 controls communication with an external apparatus through the network I/F 207. The communication controlling portion 620 has a controlling portion 621 and a communication processing portion 622. The controlling portion 621 controls a process for synchronizing the setting values with the multifunction machine 120. The communication processing portion 622 executes a process for communicating with the external apparatus through the network I/F 207.

The communication controlling portion 620 controls synchronous communication of the setting values which is performed between the management server 110 and the multifunction machine 120. When the communication processing portion 622 receives setting value update information from the multifunction machine 120, the controlling portion 621 notifies the setting data management portion 610 of the setting value update information. When the communication controlling portion 620 receives the setting value update information from the multifunction machine 120, the setting data management portion 610 reflects the setting value update information to the setting values in the device common setting value DB 521, device individual setting value DB 520, and user setting value DB 530.

When the communication processing portion 622 receives a setting value updating request from the multifunction machine 120, the controlling portion 621 notifies the setting data management portion 610 of the setting value updating request. Thus, the setting data management portion 610 generates setting value update information to be transmitted to the multifunction machine 120 and notifies the controlling portion 621 of it. The controlling portion 621 instructs the communication processing portion 622 to transmit the setting value update information notified from the setting data management portion 610 to the multifunction machine 120. The communication processing portion 622 executes the foregoing communicating process with the multifunction machine 120.

The setting data editing portion 630 has a communicating function for enabling the setting values to be viewed and edited via the network 100. The setting data editing portion 630 also has a function necessary to access the management server 110 from a Web browser of a general PC, tablet, or the like. The setting data editing portion 630 displays a setting value editing display screen to a browser UI so as to enable the setting values to be viewed, and edits the setting values on the basis of the user's operation to the setting value editing display screen. In order to execute the viewing and edition of the setting values as mentioned above, the setting data editing portion 630 uses information held in the setting value specification management DB 510 and the display resource DB 511. Information of the multifunction machine 120 registered in the management server 110 has been held in the device management DB 512. Information such as license, hardware constitution, and the like of the multifunction machine 120 has been held in the device constitution information management DB 513. In order to execute a setting of display/non-display of the setting values, a setting of edition Japanese Hyphenation conditions, and the like to the setting value editing display screen, the setting data editing portion 630 refers to the device management DB 512 and the device constitution information management DB 513. The setting data editing portion 630 can read and write the values in each DB through the setting data management portion 610 in response to the instruction received through the browser UI.

FIG. 7 is a block diagram illustrating an example of a constitution of software of a history collection and analysis application 700 which operates in the management server 110. In the embodiment, it is assumed that the history collection and analysis application 700 is stored into any one of the storing units such as RAM 203, HDD 204, and ROM 202 and is executed by the CPU 201. The history collection and analysis application 700 has a history data management portion 710, a summary data management portion 711, a communication controlling portion 720, a template management portion 730, a template execution portion 731, and a result reflection portion 732.

The history data management portion 710 manages the reading and writing of a history storage DB 740. The summary data management portion 711 manages the reading and writing of a summary DB 741. The template management portion 730 manages a template DB 750. The template DB 750 holds a template in which history information and information necessary to analyze summary data have been described. The template execution portion 731 executes a process in accordance with the template held in the template DB 750.

In the embodiment, information showing that processes including a reading and a writing of data from/into the DB, an analysis of data by script, a collection, a modification, and the like of data, and a notification to the result reflection portion 732 are executed is described in the template by SQL. As for the template, there are two kinds of templates such as filter template and analysis template. The filter template is information describing an execution of a process including such operations that history information in the history storage DB 740 is obtained and analyzed and information showing a result of the analysis is written into the summary DB 741. In the embodiment, the history storage DB 740 is an example of a first storing unit for storing the first history information of the device. The filter template is an example of first information showing an execution of a process including such operations that the history information of the device is obtained, history information in which a data amount of the history information was reduced is generated, and the history information in which the data amount was reduced is stored. The template DB 750 is an example of the second storing unit for storing the first information.

The analysis template is information describing an execution of a process including such operations that the information written in the summary DB 741 is obtained and analyzed by the filter template and the result reflection portion 732 is instructed to change the setting values of the multifunction machine 120 in accordance with a result of the analysis. The result reflection portion 732 notifies the setting value management application 600 that the setting values of the multifunction machine 120 are changed. In the following description, the filter template and the analysis template are generally called a template in accordance with necessity. In the embodiment, the analysis template is an example of second information showing an execution of a process including such operations that history information in which a data amount was reduced is obtained and the contents of the instruction to the device are determined on the basis of the history information in which the data amount was reduced. The template DB 750 is an example of third storing unit for storing the second information.

In the embodiment, a plurality of templates can be simultaneously registered in the template DB 750. The template management portion 730 manages an installation and an activation of the template. When a template is newly registered, when the operation is stopped, and when the template is installed, the template management portion 730 discriminates whether or not such a template and the other templates registered in the template DB 750 can operate, or the like. Details of the templates will be described in detail hereinafter with reference to FIG. 9.

The communication controlling portion 720 controls communication with an external apparatus through the network I/F 207. The communication controlling portion 720 has a controlling portion 721 and a communication processing portion 722. The controlling portion 721 interprets the history information transmitted from the multifunction machine 120. The communication processing portion 722 executes a process for communicating with the external apparatus through the network I/F 207.

FIG. 8 is a block diagram illustrating an example of a constitution of software of a client module 800 on the side of the multifunction machine 120.

The multifunction machine 120 is a client device. The multifunction machine 120 has a user setting value DB 812, a device setting value DB 813, and a history DB 822. The user setting value DB 812 holds setting values associated with the user who logs-in to the multifunction machine 120 among the setting values necessary for the operation of the multifunction machine 120. The device setting value DB 813 holds setting values associated with the multifunction machine 120 among the setting values necessary for the operation of the multifunction machine 120. A setting data management portion 810 manages data held in the user setting value DB 812 and the device setting value DB 813. The history DB 822 holds a history of the operations and processes executed to the multifunction machine 120. A history data management portion 820 manages data held in the history DB 822.

The setting values held in the user setting value DB 812 and the device setting value DB 813 are synchronized with the setting values held in the DB of the setting value management application 600. Therefore, by using a communication processing portion 830, a setting data synchronization processing portion 811 executes a process for synchronizing them. On the other hand, the setting values held in the history DB 822 are transmitted to the history collection and analysis application 700. In order to realize such a transmission, a history data transmitting portion 821 communicates the setting values held in the history DB 822 to the management server 110 (history collection and analysis application 700) through the communication processing portion 830.

The multifunction machine 120 has a user authentication portion 840 and a displaying portion 860. The displaying portion 860 has a displaying application for displaying the setting values and the history information of the multifunction machine 120 onto the operation unit 306 and viewing. The user authentication portion 840 executes a log-in process for identifying the user who operates the multifunction machine 120.

An application 850 is an application for actually reading and writing the setting values through the setting data management portion 810 or writing a processing result through the history data management portion 820. A plurality of applications 850 exist. The application 850 is an application for executing, for example, jobs such as copy, FX, SEND, print, and the like.

FIG. 9 is a diagram illustrating an example of a flow of data in the history collection and analysis application 700. An example of a flow of a process at the time of analyzing the history information of the multifunction machine 120 by using the filter template and the analysis template will be described with reference to FIG. 9.

Each of filter templates 901, 902, and 921 and analysis templates 911, 912, 913, and 922 is held as an individual database file into the template DB 750. The filter templates 901, 902, and 921 and the analysis templates 911, 912, 913, and 922 are managed by the template management portion 730. The template execution portion 731 executes a process in accordance with the contents described in each template.

At this time, the template execution portion 731 reads out the history information from the history storage DB 740 and a summary 932 in accordance with the description of the filter templates 901, 902, and 921. The template execution portion 731 executes a collection, a modification, and the like of the read-out history information and writes history information showing a result of them into the summary DB 741. In the embodiment, the template execution portion 731 is an example of an executing unit for executing the processes shown in the first information and the second information.

In the following description, the history information stored in the history storage DB 740 is called history storage data in accordance with necessity. The history information accumulated in the summary DB 741 is called summary data in accordance with necessity. The summary data is obtained by a method whereby the template execution portion 731 filters the history storage data.

In the embodiment, it is assumed that the contents of the history storage data are not rewritten by the filter templates 901 and 902. On the other hand, it is assumed that there is a case where the contents of the summary data are rewritten by the filter templates 901, 902, and 921.

The template execution portion 731 reads out the summary data from the summary DB 741 and analyzes in accordance with the description of the analysis templates and notifies the result reflection portion 732 of a result of the analysis.

Subsequently, an example of the process in the history collection and analysis application 700 which is executed until the analysis template 911 is executed will be described. First, the template execution portion 731 reads out the necessary history storage data from the history storage DB 740 and executes a process such as collection, modification, and the like for filtering the history storage data in accordance with the description of the filter template 901, thereby generating the summary data. The template execution portion 731 stores the summary data as one a database file called a summary 931 into the summary DB 741 in accordance with the description of the filter template 901. At the time of the first execution of the filter template 901, the template execution portion 731 generates a database file serving as a summary 931 in accordance with the description of the filter template 901. At the time of the second and subsequent execution of the filter template 901, the template execution portion 731 rewrites the contents of the summary 931 which has already been generated. This is true of summaries other than the summary 931.

The analysis template 911 is a template written so as to read out the summary 931. The template execution portion 731 reads out the summary data from the summary 931 and analyzes in accordance with the description of the analysis template 911. If it is determined that contents whose feedback is necessary exist in the multifunction machine 120 from a result of the analysis of the summary data in the summary 931 in accordance with the description of the analysis template 911, the template execution portion 731 notifies the result reflection portion 732 of such contents. In this manner, in the embodiment, the template execution portion 731 filters once the history storage data collected in the history storage DB 740 and changes it so as to be easily analyzed in accordance with the description of the filter template 901. After that, the template execution portion 731 separately executes an analyzing process in accordance with the description of the analysis template 911.

A process for reading out the data from the summary 931 is also described in the analysis template 912 in a manner similar to the analysis template 911. In this manner, the template execution portion 731 can read out one summary on the basis of the description of the plurality of analysis templates 911 and 912. Although not shown in FIG. 9, the template execution portion 731 can also read out the summary data from each of a plurality of summaries on the basis of the description of one analysis template. That is, one analysis template can read out and analyze a plurality of summary data generated respectively by the plurality of filter templates.

The template execution portion 731 executes a process such as collection, modification, and the like for filtering the history storage data in accordance with the description of the filter template 902, thereby generating the summary data and storing into the summary 932. Further, the template execution portion 731 reads out the summary data from the summary 932 in accordance with the description of the filter template 921. The template execution portion 731 executes a process such as collection, modification, and the like for filtering the summary data in accordance with the description of the filter template 921, thereby further generating the summary data and storing into a summary 933. The template execution portion 731 reads out the summary data from the summary 933 and analyzes in accordance with the description of the analysis template 922. If it is determined that contents whose feedback is necessary exist in the multifunction machine 120 from a result of the analysis of the summary data in the summary 933 in accordance with the description of the analysis template 922, the template execution portion 731 notifies the result reflection portion 732 of such contents.

For example, although the summary data in the summary 932 which is used by the analysis template 913 is data which is collected at a period of one hour, it is assumed that the summary data in the summary 933 which is used by the analysis template 922 is data which is collected at a period of one day. In such a case, it is desirable to arrange a plurality of filter templates 902 and 921 in such a manner that even if the original data (history storage data) is equal, the analysis template 922 can use the summary 933 obtained by further filtering the summary data of the summary 932.

This is because the analysis according to the analysis template 922 can be easily performed.

In this instance, the filter templates 901 and 902 are examples of information showing an execution of a process including such operations that the first history information is obtained, second history information in which a data amount of the first history information was reduced is generated, and the second history information is stored. The filter template 921 is an example of information showing an execution of a process including such operations that the second history information is obtained, third history information in which a data amount of the second history information was reduced is generated, and the third history information is stored. The analysis templates 911 to 913 are examples of information showing an execution of a process including such operations that the second history information is obtained and contents of an instruction to the device is determined on the basis of the second history information. The analysis template 922 is an example of information showing an execution of a process including such operations that the third history information is obtained and contents of an instruction to the device are determined on the basis of the third history information.

FIGS. 10A and 10B are diagrams illustrating examples of a part of the contents of the filter templates. Specifically speaking, FIG. 10A is a diagram illustrating an example of a part of a script-described portion 1001. FIG. 10B is a diagram illustrating an example of a part of a manifest-described portion 1002. In the examples illustrated in FIGS. 10A and 10B, the filter template has two files of the script-described portion 1001 and the manifest-described portion 1002. A substance of a process which is executed in accordance with the filter template is described in the script-described portion 1001. Various kinds of management information which is necessary for the template management portion 730 to manage the filter templates is described in the manifest-described portion 1002. It is desirable that the script-described portion 1001 is described by a general-purpose script language such as JavaScript (registered trademark) so that it can be executed in various kinds of server environments.

In the examples illustrated in FIGS. 10A and 10B, it is presumed that history storage data which is processed in accordance with the description of the filter template is a print job log as illustrated in TABLE 1. In the example shown in TABLE 1, at least, a log kind, an execution date of a print job, its start time, its end time, a print file name, a user name, color/monochromatic, the number of print sheets, and an end status are stored in the print job log in a table format. In TABLE 1, since the print job log is shown, all of the log kinds (Type) are set to the print job log. However, different long kinds may be stored in the history storage DB 740. In this case, information to identify a kind of history storage data is described in the log kind.

A description will be made hereinbelow on the assumption that the template execution portion 731 executes the following processes on the basis of descriptions of the script-described portion 1001 and the manifest-described portion 1002. That is, in this instance, it is assumed that the template execution portion 731 extracts data of the print job log from the print job log stored in the history storage DB 740, generates collection data of the number of output sheets per day as shown in TABLE 2, and stores into the summary DB 741.

TABLE 2

| Table summary data | | |
|---|---|---|
| id | Date | Count |
| 1 | 2016 Jan. 15 | 120 |
| 2 | 2016 Jan. 16 | 200 |

First, a data reading process 1011 is described in the script-described portion 1001 by an SQL sentence. Information showing that the data is read out of the history storage DB 740 is described in the data reading process 1011. In the example illustrated in FIG. 10A, information showing that the date and the number of output sheets are read out of the print job log is described in the data reading process 1011. Subsequently, a collecting process 1012 is described in the script-described portion 1001. Information showing that the data which was read out by the data reading process 1011 is collected is described in the collecting process 1012. In the example illustrated in FIG. 10A, information showing that a collection value of the number of output sheets per day is calculated is described in the collecting process 1012. Subsequently, a writing process 1013 is described in the script-described portion 1001. Information showing that a result of the collection according to the collecting process 1012 is written into the summary DB 741 is described in the writing process 1013. In the example illustrated in FIG. 10A, information showing that the number of collection sheets per day is inserted as one record is described in the writing process 1013.

When the template execution portion 731 executes the process described in the script-described portion 1001, summary data shown in TABLE 2 is generated. Among the items of the print job log shown in TABLE 1, the information of the items (start time, end time, print file name, user name, color/monochromatic, end status, and the like) other than the execution date (Date) and the number of output sheets (Count) is not included. Therefore, a data amount of the summary data is smaller than a data amount of the history storage data.

A writing process 1014 is described in the script-described portion 1001. A process for writing management information into the summary DB 741 is described in the summary DB 741. In the example illustrated in FIG. 10A, information showing that a last record in which the process

TABLE 1

| Table history storage data | | | | | | | | | |
|---|---|---|---|---|---|---|---|---|---|
| Id | Type | Date | StartTime | EndTime | FileName | User | Color | Count | Status |
| 1 | PrintJobLog | Jan. 15, 2016 | 11:00 | 11:01 | xxx.docx | AAA | CL | 10 | OK |
| 2 | PrintJobLog | Jan. 15, 2016 | 12:15 | 12:18 | yyy.xlsx | BBB | BW | 100 | OK |
| 3 | PrintJobLog | Jan. 15, 2016 | 12:30 | 12:30 | zzz.ppt | CCC | CL | 5 | Cancel | was finished among the records of the print job log is written into the summary DB 741 in order to record information showing to which portion the template execution portion 731 read out the print job log is described in the writing process 1014. At the time of the next process according to the description of the filter template (script-described portion 1001), the template execution portion 731 refers to the last record. Therefore, it is possible to construct in such a manner that the template execution portion 731 does not read the same information twice.

Various kinds of management information necessary for the template management portion 730 to manage the filter template and various kinds of information necessary for the template management portion 730 to actually execute the filter template are described in the manifest-described portion 1002. As mentioned above, information which is referred to by the template execution portion 731 in order to execute the process described in the script-described portion 1001 is included in the manifest-described portion 1002. It is desirable that the manifest-described portion 1002 is described by a format such as JSON which can express a general-purpose data structure. In the example illustrated in FIG. 10B, a file name (JSFilename) of a file having the script-described portion 1001 is described in the manifest-described portion 1002. A file name (FromDBFilename) of a database file (database file in the history storage DB 740 or summary 932) having data which is read out in accordance with the description of the script-described portion 1001 is described in the manifest-described portion 1002. A file name (ToDBFilename) of a database file (summaries 931, 932, 933) into which the summary data is written in accordance with the description of the script-described portion 1001 is described in the manifest-described portion 1002. An initial start date and time (StartTime) and a start period (RepeatFreq) of the process according to the script-described portion 1001 are described in the manifest-described portion 1002. A kind (ReadLogType) of a log which is read out in the process according to the script-described portion 1001 is described in the manifest-described portion 1002. When the processes according to the script-described portion 1001 are executed, the template execution portion 731 refers to them.

In the embodiment, the print job log (table history storage data) shown in TABLE 1 is an example of first history information having history information about a plurality of items. The table summary data shown in TABLE 2 is an example of history information which has history information about partial items among the plurality of items and in which a data amount was reduced. The script-described portion 1001 is an example of a first portion of first information. The manifest-described portion 1002 is an example of a second portion of the first information. FromDBFilename is an example of information for specifying an obtaining source of the history information. ToDBFilename is an example of information for specifying a storage destination of the history information in which the data amount was reduced.

In this example, a case where the initial start date and time and the start period are described in the manifest-described portion 1002 as an execution period of the process according to the filter template has been described as an example. However, it is not always necessary to construct as mentioned above. The process according to the filter template may be executed, for example, each time the history information of a log kind serving as a target of the process according to the filter template is written into the history storage DB 740. The process according to the filter template may be executed, for example, each time such history information is written into the history storage DB 740 ten times. In this manner, the process according to the filter template (script-described portion 1001) may be started in an event-driven manner.

FIGS. 11A and 11B are diagrams illustrating examples of a part of the contents of the analysis templates. Specifically speaking, FIG. 11A is a diagram illustrating an example of a part of a script-described portion 1101. FIG. 11B is a diagram illustrating an example of a part of a manifest-described portion 1102. In the examples illustrated in FIGS. 11A and 11B, the analysis template has two files of the script-described portion 1101 and the manifest-described portion 1102 in a manner similar to the filter template. A substance of a process which is executed in accordance with the analysis template is described in the script-described portion 1101. Various kinds of management information which is necessary for the template management portion 730 to manage the analysis templates is described in the manifest-described portion 1102. It is desirable that the script-described portion 1101 is described by a general-purpose script language such as JavaScript (registered trademark) so that it can be executed in various kinds of server environments.

First, a data reading process 1111 is described in the script-described portion 1101 by an SQL sentence. Information showing that data is read out of the summary DB 741 is described in the data reading process 1111. In the example illustrated in FIG. 11A, information showing that the information of the number of output sheets per day (refer to TABLE 2) is obtained from the summary data generated by the process according to the filter templates in FIGS. 10A and 10B is described in the data reading process 1111. Subsequently, a collecting process 1112 is described in the script-described portion 1101. Information showing that the data which was obtained according to the data reading process 1111 is collected is described in the collecting process 1112. In the example illustrated in FIG. 11A, information showing that an average value per day of the number of output sheets within a period of time is calculated is described in the collecting process 1112. Subsequently, a reflecting process 1113 is described in the script-described portion 1101. Contents of a process for reflecting a result of the collection according to the collecting process 1112 to the multifunction machine 120 is described in the reflecting process 1113. In the example illustrated in FIG. 11A, such a process that if the average value per day of the number of output sheets within the period of time is equal to or larger than a threshold value, a specific setting of the multifunction machine 120 is changed is described in the reflecting process 1113. The template execution portion 731 notifies the result reflection portion 732 of a result of the process according to the reflecting process 1113. The result reflection portion 732 instructs the setting value management application 600 to change the specific setting of the multifunction machine 120.

Various kinds of management information which is necessary for the template management portion 730 to manage the analysis template and various kinds of management information which is necessary for the template management portion 730 to actually execute the analysis template are described in the manifest-described portion 1102. In this manner, information which is referred to by the template execution portion 731 in order to execute the process described in the script-described portion 1101 is included in the manifest-described portion 1102. It is desirable that the manifest-described portion 1102 is described by a format such as JSON which can express a general-purpose data structure. In the example illustrated in FIG. 11B, a file name (JSFilename) of a file having the script-described portion 1101 is described in the manifest-described portion 1102. A file name (FromDBFilename) of a database file (summaries 931, 932, 933) having data which is read out in accordance with the description of the script-described portion 1101 is described in the manifest-described portion 1102. An initial start date and time (StartTime) and a start period (Repeat-Freq) of the process according to the script-described portion 1101 are described in the manifest-described portion 1102. A first record (FirstRecord) and a last record (LastRecord) of the database file (summaries 931, 932, 933) which is read out in accordance with the description of the script-described portion 1101 are described in the manifest-described portion 1102. A threshold value (Threshold) which is used in the process according to the script-described portion 1101 is described in the manifest-described portion 1102. Such a threshold value is compared with a value which is obtained as a result of the process according to the script-described portion 1101. When the processes according to the script-described portion 1101 are executed, the template execution portion 731 refers to them. Among them, the first record, the last record, and the threshold value are values which are referred to in the analysis template and are data which can be also edited as an operation fine adjustment after the analysis template was installed. The process according to the analysis template (script-described portion 1101) is not periodically started but may be started by the event-driven manner in a manner similar to that for the filter template.

The script-described portion 1101 is an example of a first portion of the second information. The manifest-described portion 1102 is an example of a second portion of the second information. FromDBFilename is an example of information for specifying an obtaining source of the history information in which a data amount was reduced. ToDBFilename is an example of information for specifying a storage destination of the contents of an instruction to the foregoing device.

In the process according to the description of the analysis template, different from the filter template, a result of the process is not written into the database file (summaries 931, 932, 933). Therefore, in the manifest-described portion 1102, "NULL" is written into a column of the file name (ToDBFilename) of the database file into which the data is written in accordance with the description of the script-described portion 1101. In this manner, the column of the file name (ToDBFilename) is provided for the script-described portion 1101 and "NULL" is set into this column. By setting as mentioned above, it is assumed that the filter template and the analysis template are the templates of the same format, and they can be generated without being distinguished.

In the examples of FIGS. 10A, 10B, 11A, and 11B, the template execution portion 731 extracts the date and the number of print sheets from the history information in accordance with the description of the filter template, thereafter, collects the number of print sheets per date in accordance with the description of the analysis template, and discriminates whether or not a collection value exceeds a threshold value. If the collection value exceeds the threshold value, the template execution portion 731 notifies the result reflection portion 732 that a value of a specific key of the multifunction machine 120 is controlled. However, the contents of the filter template and the analysis template are not limited to them. For example, the following use case can be realized.

As a first example, the template execution portion 731 executes the filter template for collecting the number of print sheets every day of the week or every time zone. In a manner similar to the examples of FIGS. 10A, 10B, 11A, and 11B, among the items of the print job log shown in TABLE 1, the information of the items other than the execution date (Date) and the number of output sheets (Count) is not included in the summary data by such a template. That is, the information of the start time, end time, print file name, user name, color/monochromatic, end status, and the like is not included in the summary data. Therefore, a data amount of the summary data is smaller than a data amount of the history storage data and is reduced.

The template execution portion 731 discriminates whether or not the number of print sheets of a specific day of the week or a specific time zone exceeds the threshold value in accordance with the description of the analysis template. If the number of print sheets of the specific day of the week or the specific time zone does not exceed the threshold value, the template execution portion 731 notifies the result reflection portion 732 to make the multifunction machine 120 stand by so that it can immediately print without being shifted to a sleep mode on the day of the week or the time zone. Instead of it, the template execution portion 731 may notify the result reflection portion 732 to enable the printing only on the day of the week or the time zone by setting a print speed to be higher than a speed before the change. By executing the process in this manner, a template which intends to improve a productivity of printed matters in the multifunction machine 120 can be generated.

As a second example, the template execution portion 731 executes the filter template for collecting the log kind every user. In this case, the template execution portion 731 extracts the information of the log kind (Type) and the user name (User). Therefore, the information of the items other than the log kind (Type) and the user name (User) among the items of the print job log shown in TABLE 1 is not included in the summary data. That is, the information of the execution date, number of output sheets, start time, end time, print file name, color/monochromatic, end status, and the like is not included in the summary data. Therefore, a data amount of the summary data is smaller than a data amount of the history storage data and is reduced.

The template execution portion 731 collects the log kind every user and discriminates whether or not the user in which the number of execution times of a specific job (for example, SEND) exceeds a threshold value exists on the basis of a result of the collection in accordance with the description of the analysis template. If the user in which the number of execution times of the specific job (for example, SEND) exceeds the threshold value exists, the template execution portion 731 notifies the result reflection portion 732 to change an initial display screen after the log-in of the user to a state where an application for executing such a job is activating. By executing the process in this manner, a template which intends to improve a usability of the multifunction machine 120 of the user can be generated.

As a third example, the template execution portion 731 executes a filter template for extracting a print file name and a print time of a specific user from the print job log. In this case, the template execution portion 731 extracts the information of the log kind (Type), user name (User), print file name (FileName), execution date (Date), and end time (EndTime). Therefore, the information of the items other than the log kind (Type), user name (User), print file name (FileName), execution date (Date), and end time (EndTime) among the items of the print job log shown in TABLE 1 is not included in the summary data. That is, the information of the number of output sheets, start time, color/monochromatic, end status, and the like is not included in the summary data. Therefore, a data amount of the summary data is smaller than a data amount of the history storage data and is reduced.

The template execution portion 731 collects the print file name, log kind, execution date, and end time per user in accordance with the description of the analysis template. The template execution portion 731 discriminates whether or not the user who instructed such an operation that the file of the same name is printed a plurality of number of times within a predetermined time a predetermined number of times (the number of times larger than a threshold value) exists on the basis of a result of the collection. If the user who instructed such an operation that the file of the same name is printed a plurality of number of times within the predetermined time the predetermined number of times exists, the template execution portion 731 determines that the user is a user who often retries the printing. The template execution portion 731 notifies the result reflection portion 732 to display a confirmation screen of the setting contents at the time of printing. By executing the process in this manner, a template which intends to prevent an erroneous operation of the user can be generated.

As mentioned above, in the embodiment, the management server 110 collects history information (job log, operation log, error log, etc.) of the multifunction machine 120 into the history storage DB 740 and generates and inputs a number of templates on the basis of the collected history information. By executing the process in this manner, a setting state which improves a usability of the multifunction machine 120 can be formed.

Subsequently, an example of a process in the case where the template management portion 730 installs the template will be described with reference to flowcharts of FIGS. 12A and 12B. FIG. 12A is a flowchart for describing an example of the process of the template management portion 730 at the time of installing the analysis template. FIG. 12B is a flowchart for describing an example of the process of the template execution portion 731 at the time of installing the filter template. The processes of the flowcharts of FIGS. 12A and 12B are realized by using, for example, the CPU 201 of the management server 110.

First, an example of the process of the template management portion 730 at the time of installing the analysis template will be described with reference to the flowchart of FIG. 12A.

The template management portion 730 installs the template in accordance with the contents described in the manifest-described portions 1002 and 1102 prepared for the template in order to control the execution of a plurality of templates.

When the summary data serving as a target of analysis does not exist, the template management portion 730 cannot install the analysis template. Therefore, before the analysis template is installed, the template management portion 730 confirms the existence of the summary data serving as a target of analysis in the analysis template.

When a request to start the installation of the analysis template is received in step S1201, the template management portion 730 reads out the manifest-described portion 1102 of the analysis template serving as a target of the installation in step S1202. Subsequently, in step S1203, the template management portion 730 reads out the file name (FromDBFilename) of the database file from the manifest-described portion 1102. The template management portion 730 discriminates whether or not the filter template of the file name which was read out from the manifest-described portion 1102 exists in the template DB 750 (whether or not it has been installed).

If the filter template exists in the template DB 750 as a result of the discrimination, the processing routine advances to step S1204. The template management portion 730 executes a process for executing the operation of the analysis template serving as a target of the installation. For example, the template management portion 730 executes an installing process including such an operation that execution timing of the relevant analysis template is scheduled so that the process can be started at the timing described in the manifest-described portion 1102. On the other hand, if the filter template does not exist in the template DB 750, the processing routine advances to step S1205. In step S1205, the template management portion 730 makes the installation of the template an error, and displays information showing such a fact onto the displaying unit 210.

Subsequently, an example of the process of the template management portion 730 at the time of installing the filter template will be described with reference to the flowchart of FIG. 12B.

When a request to start the installation of the filter template is received in step S1211, the template management portion 730 reads out the manifest-described portion 1002 of the filter template serving as a target of the installation in step S1212. Subsequently, in step S1213, the template management portion 730 reads out the kind of log (ReadLogType) from the manifest-described portion 1102. The template management portion 730 discriminates whether or not another filter template to read out the same log kind as that of the log which was read out from the manifest-described portion 1102 exists in the template DB 750. If another filter template to read out the same log kind exists in the template DB 750 as a result of the discrimination, the same record is read out. For this purpose, the management server 110 needs to control the timing for deleting the relevant record. Therefore, the processing routine advances to step S1214. If another filter template to read out the same log kind does not exist in the template DB 750, step S1214 is omitted and the processing routine advances to step S1215, which will be described hereinafter.

In step S1214, the template management portion 730 discriminates whether or not the filter template serving as a target of the installation is a filter template of a longest start period (RepeatFreq) among the filter templates to read out the same log kind. If the start period of the filter template serving as a target of the installation is longest as a result of the discrimination, the processing routine advances to step S1215. On the other hand, if the start period of the filter template serving as a target of the installation is not longest, step S1215 is omitted and the processing routine advances to step S1216, which will be described hereinafter.

In step S1215, the template management portion 730 sets the filter template serving as a target of the installation to a representative template about the log kind which is read out by the relevant filter template. In the embodiment, the deletion control of the record is performed every long kind by using the start period of the filter template. An example of the operation of the representative template will be described hereinafter.

Subsequently, in step S1216, the template management portion 730 executes a process for executing the operation of the filter template serving as a target of the installation. For example, the template management portion 730 executes a process including such an operation that the execution timing of the relevant filter template is scheduled so that the process can be started at the timing described in the manifest-described portion 1102.

In the embodiment, it is assumed that the record serving as a target which is deleted by the template execution portion 731 is a record stored in the history storage DB 740. Therefore, the filter template in which the file name of the database file existing in the history storage DB 740 is described as a file name (FromDBFilename) of the manifest-described portion 1002 becomes the representative template. In other words, a filter template in which the reading-out of a summary has been described like a filter template 921 does not become the representative template. Even in a filter template in which the reading-out of the same log kind as that of the filter template serving as a target of the installation has been described, a filter template in which the reading-out of the summary has been described does not become another filter template in the process of step S1213. In the example illustrated in FIG. 9, the filter template 921 does not become another filter template in the process of step S1213.

Subsequently, an example of a series of processes of the information processing system at the time of collecting the history information of the multifunction machine 120 and performing the control of the multifunction machine 120 will be described with reference to flowcharts of FIGS. 13A and 13B.

FIG. 13A is the flowchart for describing an example of an outline of the operation of the information processing system at the time of storing the history information into the history storage DB 740. FIG. 13B is the flowchart for describing an example of the operation of the information processing system at the time of changing the setting of the multifunction machine 120. The processes of the flowcharts of FIGS. 13A and 13B are realized by using, for example, the CPU 201 of the management server 110 and the CPU 401 of the multifunction machine 120.

In step S1321, the applications 850 of the multifunction machine 120 executes a job. For example, the job includes jobs such as copy, FAX, SEND, print, and the like. In step S1322, the applications 850 of the multifunction machine 120 writes the history information of the job executed in step S1321 into the history DB 822. After that, in step S1323, the history data transmitting portion 821 of the multifunction machine 120 transmits the history information written in step S1322 to the history collection and analysis application 700.

When the history information is received, the history data management portion 710 of the history collection and analysis application 700 stores the relevant history collection into the history storage DB 740 in step S1301.

In the template execution portion 731, a task is prepared so as to operate when the start timing described in the manifest-described portions 1002 and 1102 comes every template by an instruction of the template management portion 730. In the embodiment, the start timing is specified by the initial start date and time and the start period. The start timing may be specified by a timer ignition according to time, writing of a target log, or the like. In step S1302, the template execution portion 731 stands by until the timing for executing the template with respect to each template comes. When the execution timing comes, the processing routine advances to step S1303. In step S1303, the template execution portion 731 executes the processes described in the script-described portions 1001 and 1101 in the template.

In the case of executing the filter template, the template execution portion 731 generates summary data. In the case of executing the analysis template, there is a case where the template execution portion 731 is accompanied with an instruction of the changing process of the setting values of the multifunction machine 120. In such a case, the result reflection portion 732 instructs a change of the setting values of the multifunction machine 120 in response to an instruction from the template execution portion 731. If a description of an action for changing the setting values of the multifunction machine 120 exists in the analysis template, the result reflection portion 732 notifies the setting value management application 600 of a change of the setting values of the multifunction machine 120. In step S1311, the setting data management portion 610 receives the notification of the change of the setting values of the multifunction machine 120. In accordance with the setting values shown in such a notification, the setting data management portion 610 updates the DB of one of the device individual setting value DB 520, device common setting value DB 521, and user setting value DB 530.

On the other hand, the setting data synchronization processing portion 811 of the multifunction machine 120 inquires the setting data management portion 610 of the setting value management application 600 about the presence or absence of the updating of the setting values of the multifunction machine 120 at the timing defined in the own setting data synchronization processing portion 811. For example, the setting data synchronization processing portion 811 can perform such an inquiry by a periodic polling or can perform the inquiry when there is a log-in from the user. Processes in step S1324 and subsequent steps are an example of the flow of the operation of the information processing system after such an inquiry.

In step S1324, the setting data synchronization processing portion 811 of the multifunction machine 120 inquires the setting value management application 600 about the presence or absence of the change of the setting values of the multifunction machine 120 after the last synchronization time. That is, the setting data synchronization processing portion 811 of the multifunction machine 120 confirms the presence or absence of the updating of the setting values of the multifunction machine 120. In step S1312, the controlling portion 621 of the setting value management application 600 receives the inquiry from the setting data synchronization processing portion 811. In step S1313, the controlling portion 621 extracts a different portion (update difference) between the setting values of the multifunction machine 120 at a point of time of the previous inquiry in step S1324 and the setting values of the multifunction machine 120 at a point of time of the present inquiry in step S1324. The communication processing portion 622 returns the update difference to the setting data synchronization processing portion 811 of the multifunction machine 120.

Subsequently, the setting data synchronization processing portion 811 receives the update difference in step S1325 and updates either the user setting value DB 812 or the device setting value DB 813 by the target data in step S1326.

As mentioned above, the information processing system in the embodiment performs the collection and analysis of the history information in the management server 110, the change instruction of the setting values in the management server 110, and the changing process of the setting values of the multifunction machine 120 synchronized with the management server 110. Thus, when the history information of the specific pattern described in the analysis template can be confirmed, various kinds of setting values of the multifunction machine 120 can be automatically changed in an interlocking relational manner with it.

Subsequently, an example of details of step S1303 in FIG. 13B will be described with reference to a flowchart of FIG. 14.

In step S1401, the template execution portion 731 executes the contents, as they are, described in the script-described portions 1001 and 1101 of the template. In step S1402, the template execution portion 731 discriminates whether or not the filter template executed in step S1401 is a template recorded as a representative template at the time of the installation (step S1215 in FIG. 12B). If the filter template is the representative template, the processing routine advances to step S1403. In step S1403, the template execution portion 731 sets a flag which enables the record which was read out before the record which had been read out at the time of the present execution of the filter template among the records of the history storage data in the history storage DB 740 to be deleted. In the embodiment, the template execution portion 731 is an example of a determining unit for determining the relevant first history information in which there is no need to be obtained as first history information serving as a deletion target when there is no need to obtain the first history information in the foregoing process according to the plurality of first information.

If the filter template executed in step S1401 is not the representative template, the template execution portion 731 finishes the process according to the flowchart of FIG. 14 without executing the process of step S1403.

The history data management portion 710 deletes the record of the history storage data in the history storage DB 740 periodically or at the timing when a specific trigger has occurred or the like in order to suppress an increase in size of the history storage DB 740. The history data management portion 710 deletes the data of the record in which the deletion flag has been set in step S1403. Thus, such a situation that the data is deleted before the template reads out the data which the template wants to read out can be suppressed as much as possible.

The embodiment has been described with respect to the case, as an example, where the filter template whose start period is longest is set to the representative template and the records which were read out up to the previous execution are deleted at the time of the present execution of the representative template. However, with respect to all filter templates which need the read-out of the record in the history storage DB 740, if a fact that the relevant record was read out can be specified, it is not always necessary to execute the processes as mentioned above. For example, the template execution portion 731 may store the read-out record at the time of the execution of each filter template. In this case, from the information of the record which was stored as mentioned above, the template execution portion 731 can specify a fact that the relevant record was read out with respect to all of the filter templates which need the read-out of the record in the history storage DB 740.

An example of effects of the present embodiment will now be described.

For example, in the related arts, when the user of the multifunction machine 120 repeats an operation mistake in a situation where a certain setting has been made in the information processing system, the setting cannot be changed to such a setting as to prevent the operation mistake. For example, in the related arts, a change in setting for enabling the system administrator to easily make a management of the system cannot be performed to the multifunction machine 120. Further, in the related arts, in the information processing system accompanied with the hardware operation such as an image forming apparatus, the action (for example, picture quality or power control) setting which is optimum under its operation environment cannot be derived.

On the other hand, in the embodiment, the management server 110 uses the filter template and analysis template as templates for executing the process to instruct the multifunction machine 120 by using the history storage data in the history storage DB 740. The filter template is a template in which information showing that the summary data is generated by filtering the history storage data in the history storage DB 740 and stored into the summary DB 741 has been described. The analysis template is a template in which information showing that the contents of the instruction to the multifunction machine 120 are determined by analyzing the summary data has been described. Therefore, by changing the setting values of the multifunction machine 120 by the management server 110 by using the filter template and analysis template, the multifunction machine 120 can execute the operation to which the past history has been reflected. Specifically speaking, an operation state of the multifunction machine 120 and the operation and a tendency of the user are analyzed and the optimum setting of the system and the usability of the user can be improved on the basis of a result of the analysis.

As for the tendency of the user who analyzes and the settings which are reflected to the multifunction machine 120, since there are a plurality of kinds and combinations of them, it is indispensable to simultaneously perform a plurality of kinds of control. Therefore, by preparing many templates serving as analysis scenarios, fine control can be made to the information processing system for realizing a variety of processes. There is also a case where a server for making the holding and analysis of data operative cannot be introduced but they are operated by the multifunction machine 120. In such a case, a restriction occurs in the resources such as storage, CPU, and the like. On the other hand, in the embodiment, since a plurality of templates are used, such a situation that the process according to the description of the template becomes heavy can be suppressed. When the data necessary for the processes of all of the filter templates is read out of the history storage DB 740, the relevant data is reduced, so that a data amount of the data stored in the history storage DB 740 can be reduced. Since the filter templates are arranged in a multistage (serially) manner, such a situation that the extraction of information in the process according to the analysis template becomes complicated can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2016-195832, filed Oct. 3, 2016, which is hereby incorporated by reference herein in its entirety.

REFERENCE SIGNS LIST

100: network, 110: management server, 120: multifunction machine

The invention claimed is:

1. An information processing apparatus comprising:
a memory storing instructions, and
at least one processor executing the instructions causing the information processing apparatus to:
store first history information of a device;
store first information showing an execution of a process including such operations that history information of the device is obtained, history information in which a data amount of the history information was reduced is generated, and the history information in which the data amount was reduced is stored;
store, separately from the first information, second information showing an execution of a process including such operations that the history information in which the data amount was reduced is obtained and contents of an instruction to the device are determined on the basis of the history information in which the data amount was reduced; and
execute the processes shown in the first information and the second information,
wherein the first information is information for an execution of a process including such operations that the first history information is obtained, second history information in which the data amount of the first history information was reduced is generated, and the second history information is stored, and
wherein the second information is information for an execution of a process including such operations that the second history information is obtained and contents of an instruction to the device are determined on the basis of the second history information.

2. The information processing apparatus according to claim 1, wherein the instructions further cause the information processing apparatus to:
store another first information being information for an execution of a process including such operations that the second history information is obtained, third history information in which a data amount of the second history information was reduced is generated, and the third history information is stored; and
store another second information being information for an execution of a process including such operations that the third history information is obtained and contents of an instruction to the device are determined on the basis of the third history information.

3. The information processing apparatus according to claim 2, wherein the instructions further cause the information processing apparatus to determine in such a manner that when there is no need to obtain the first history information in the process according to the first information and the another first information, the first history information which does not need to be obtained in the first history information is determined as the first history information serving as a deletion target.

4. The information processing apparatus according to claim 1, wherein the history information in which the data amount was reduced is stored as one file.

5. The information processing apparatus according to claim 1, wherein:
the first information includes a first portion in which contents of the process which is executed in accordance with the first information have been described and a second portion in which information which is referred to when the process is executed has been described; and
the second information includes a first portion in which contents of the process which is executed in accordance with the second information have been described and a second portion in which information which is referred to when the process is executed has been described.

6. The information processing apparatus according to claim 1, wherein:
the first information includes information to specify an obtaining source of the history information and information to specify a storage destination of the history information in which the data amount was reduced as information which is referred to when the process is executed in accordance with the first information; and
the second information includes information to specify an obtaining source of the history information in which the data amount was reduced as information which is referred to when the process is executed in accordance with the first information.

7. The information processing apparatus according to claim 6, wherein the second information further includes information showing that there is no storage destination of the contents of the instruction to the device as information which is referred to when the process is executed in accordance with the first information.

8. The information processing apparatus according to claim 1, wherein the contents of the instruction to the device include an instruction of a change of setting values of the device.

9. The information processing apparatus according to claim 1, wherein:
the first history information has history information of the device about a plurality of items; and
the history information in which the data amount was reduced has history information of the device about a part of the plurality of items.

10. An information processing method comprising:
storing first history information of a device into a storage medium or a storing apparatus;
storing, into the storage medium or the storing apparatus, first information showing an execution of a process including such operations that history information of the device is obtained, history information in which a data amount of the history information was reduced is generated, and the history information in which the data amount was reduced is stored;

storing, into the storage medium or the storing apparatus separately from the first information, second information showing an execution of a process including such operations that the history information in which the data amount was reduced is obtained and contents of an instruction to the device are determined on the basis of the history information in which the data amount was reduced; and executing the processes shown in the first information and the second information, wherein the first information is information for an execution of a process including such operations that the first history information is obtained, second history information in which the data amount of the first history information was reduced is generated, and the second history information is stored, and wherein the second information is information for an execution of a process including such operations that the second history information is obtained and contents of an instruction to the device are determined on the basis of the second history information.

11. A non-transitory computer-readable storage medium which stores a program for causing a computer to perform an information processing method comprising:

storing first history information of a device into a storage medium or a storing apparatus;

storing, into the storage medium or the storing apparatus, first information showing an execution of a process including such operations that history information of the device is obtained, history information in which a data amount of the history information was reduced is generated, and the history information in which the data amount was reduced is stored;

storing, into the storage medium or the storing apparatus separately from the first information, second information showing an execution of a process including such operations that the history information in which the data amount was reduced is obtained and contents of an instruction to the device are determined on the basis of the history information in which the data amount was reduced; and executing the processes shown in the first information and the second information, wherein the first information is information for an execution of a process including such operations that the first history information is obtained, second history information in which the data amount of the first history information was reduced is generated, and the second history information is stored, and wherein the second information is information for an execution of a process including such operations that the second history information is obtained and contents of an instruction to the device are determined on the basis of the second history information.

\* \* \* \* \*